(12) United States Patent
Yamada et al.

(10) Patent No.: US 10,311,157 B2
(45) Date of Patent: Jun. 4, 2019

(54) METHOD FOR UPDATE PROCESSING, AND APPARATUS

(71) Applicant: FUJITSU LIMITED, Kawasaki-shi, Kanagawa (JP)

(72) Inventors: Kiichi Yamada, Numazu (JP); Naohiro Itou, Numazu (JP); Masahiko Nagata, Kawasaki (JP); Mitsuhiro Kinomura, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 356 days.

(21) Appl. No.: 14/810,973

(22) Filed: Jul. 28, 2015

(65) Prior Publication Data
US 2016/0055152 A1 Feb. 25, 2016

(30) Foreign Application Priority Data
Aug. 22, 2014 (JP) ................. 2014-169414

(51) Int. Cl.
*G06F 17/00* (2006.01)
*G06F 17/30* (2006.01)

(52) U.S. Cl.
CPC .. *G06F 17/30348* (2013.01); *G06F 17/30345* (2013.01)

(58) Field of Classification Search
CPC ............... G06F 17/30348; G06F 17/30345
USPC ........................ 707/640, E17.007
See application file for complete search history.

(56) References Cited

U.S. PATENT DOCUMENTS 7,461,065 B2 * 12/2008 Rajakumar ............ G06F 9/526
707/E17.007
10,073,874 B1 * 9/2018 Sivathanu ......... G06F 17/30321
2005/0033720 A1 2/2005 Verma et al.
2007/0179936 A1 * 8/2007 Rajakumar ............ G06F 9/526
707/E17.007
2007/0233683 A1 * 10/2007 Verma ................ G06F 9/466
707/E17.007
2009/0276430 A1 * 11/2009 Bruso ............ G06F 17/30362
707/E17.007
2010/0146334 A1 * 6/2010 Jacobsen ......... G06F 17/30371
714/15
2011/0273737 A1 * 11/2011 Hirao ................. G06F 21/105
358/1.14

FOREIGN PATENT DOCUMENTS

| JP | 10-91489 | 4/1998 |
|---|---|---|
| JP | 2001-134476 | 5/2001 |
| JP | 2007-501468 | 1/2007 |
| JP | 2014-117844 | 6/2014 |

OTHER PUBLICATIONS

Japanese Office Action dated Jan. 23, 2018 in related Japanese Patent Application No. 2014-169414 **.

* cited by examiner

*Primary Examiner* — Phong H Nguyen
(74) *Attorney, Agent, or Firm* — Staas & Halsey LLP

(57) ABSTRACT

A method includes: upon receipt of a request of update processing for a first record including a numerical data item in a database, generating, by a processor, a second record by duplicating the first record while a value corresponding to an update content of the update processing is set to the numerical data item, the update processing being processing of updating the value of the numerical data item according to the update content; and executing the update processing for the second record in response to the request.

12 Claims, 26 Drawing Sheets

| ARTICLE | COUNT |
|---|---|
| CARROT | 5 |
| CARROT | 4 |
| CARROT | 1 |

| ARTICLE | COUNT |
|---|---|
| CARROT | 5 |
|  | 4 |
|  | 1 |

FIG. 20

| ARTICLE | COUNT | ADDITION XID | DELETION XID | STATE |
|---|---|---|---|---|
| CARROT | 6 | Tx0 | | VALID |
| CARROT | 4 | Tx0 | | VALID |

⇩

| ARTICLE | COUNT | ADDITION XID | DELETION XID | STATE |
|---|---|---|---|---|
| CARROT | 10 | Tx0 | | VALID |

METHOD FOR UPDATE PROCESSING, AND APPARATUS

CROSS-REFERENCE TO RELATED APPLICATION

This application is based upon and claims the benefit of priority of the prior Japanese Patent Application No. 2014-169414, filed on Aug. 22, 2014, the entire contents of which are incorporated herein by reference.

FIELD

The embodiments discussed herein are related to a method for update processing and an apparatus.

BACKGROUND

Due to centralization of processing achieved with improvement of performances of an information processor and an increase in users, a lot of transactions run in one system. To improve performances of such system in which a lot of transactions run, there is a demand for increase in the number of concurrently executable transactions, that is, improvement of concurrency of transactions.

For updating a record stored in a database by transaction processing, the update target record is updated under exclusive control in order to keep consistency of the database. In this case, if the number of transactions concurrently executed is increased, a phenomenon called as lock thrashing in which the transactions block each other. The lock thrashing decreases throughputs (the number of transactions completed per time), and obstructs improvement of the concurrency of transactions.

Especially under an environment which an input/output (I/O) performance is improved by using a solid state drive (SSD), a flash memory, or an in-memory database, the aforementioned exclusive control rather than the I/O performance causes a bottleneck. To enhance the concurrency of transactions, there is a demand for a technique of reducing the bottleneck caused by the exclusive control of records.

A method called as reader/writer lock is known as a technique of decreasing the number of transactions blocked by the exclusive control. The reader/writer lock uses two types of lock, namely, lock for reference processing and lock for update processing so that reference processing on a record can be controlled so as not to block each other. In addition, multi version concurrency control (MVCC) and two copy versioning are also known. According to these methods, two or more versions of data are prepared so that reference processings or reference processing and update processing may be controlled so as not to block each other.

As examples of related art, Japanese National Publication of International Patent Application No. 2007-501468 and Japanese Laid-open Patent Publication No. 10-91489 are known.

SUMMARY

According to an aspect of the invention, a method includes: upon receipt of a request of update processing for a first record including a numerical data item in a database, generating, by a processor, a second record by duplicating the first record while a value corresponding to an update content of the update processing is set to the numerical data item, the update processing being processing of updating the value of the numerical data item according to the update content; and executing the update processing for the second record in response to the request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a view illustrating merge processing;

DESCRIPTION OF EMBODIMENTS

Figure 1:
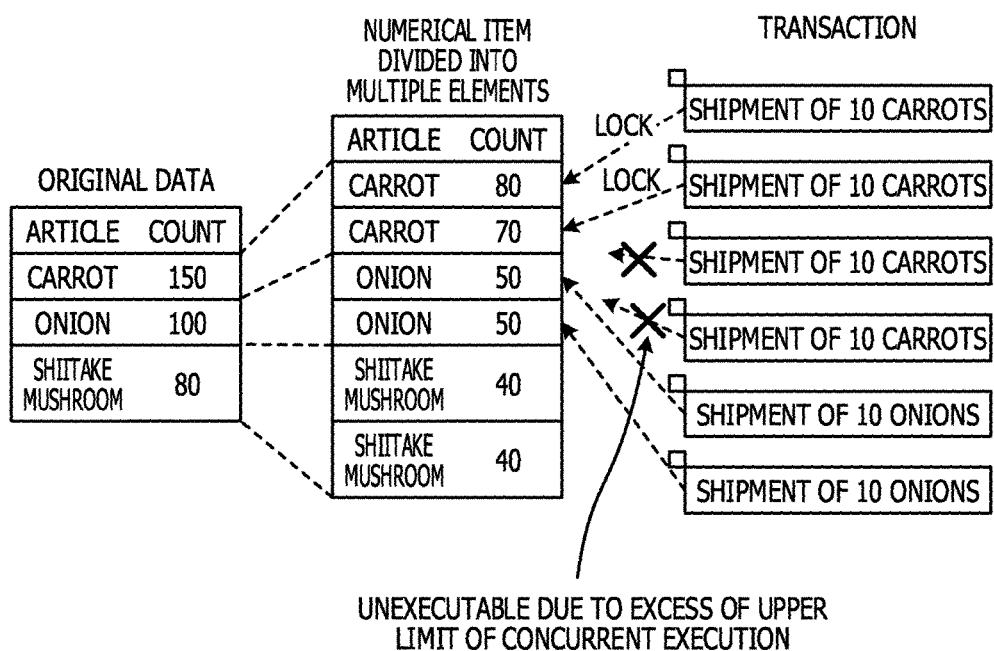
FIG. 1, FIG. 2, and FIG. 3 are views illustrating element division by a comparative method.

According to a technique of decreasing the number of transactions blocked by exclusive control, a record is exclusively locked for update processing, and the same record may not be allowed to be updated concurrently. The reason for the exclusive lock of a record for the update processing is to ensure the reliability of the transaction processing. Once a record is locked exclusively, the correctness of the record is ensured. However, until the update processing of one transaction is completed, the update processing of another transaction is completely blocked. This obstructs improvement of the concurrency of transactions.

An object of the embodiments is to improve the concurrency of update processings on one and the same record.

An example of embodiments of the present disclosure will be described below with reference to figures. In the embodiments, an element indicating a value in a numerical item (details will be described later) of a record is dynamically generated corresponding to update processing. Then, among a plurality of elements including the generated element, an element to be updated is subjected to exclusive processing (lock), and is updated.

Before the details in each embodiment are described, description will be first provided for update processing on a numerical item, and problems that may occur if the value of the numerical item is previously divided into a plurality of elements, for the purpose of describing the reason why the element corresponding to the update processing is dynamically generated.

The reason why the transaction processing is executed while the record to be updated is locked to block the update processing of another transaction is to ensure the reliability of the transaction processing.

However, depending on intended use or tasks of a system, the correctness of the processing may be ensured even without blocking the update processing of another transaction completely. For example, a record indicating the stock state of products is subjected to processing of subtracting the number of products shipped from the number of products in stock at shipment, and processing of adding the number of products arrived to the number of products in stock at arrival of products. Generally, as long as the number of products in stock does not fall below 0, arrival processing can be executed during shipment processing, and the shipment processing can be executed during the arrival processing.

As another example, a record indicating a balance on an account is subjected to processing of decreasing the balance at withdrawal or increasing the balance at deposit. Also in this case, as long as the deposit or withdrawal satisfies a predetermined condition, withdrawal processing can be executed during deposit processing, and the deposit processing can be executed during the withdrawal processing.

An item having a value mathematically expressing "cardinality" such as "number", "count" and "amount" is referred to as "numerical item". As in the above-mentioned examples, in the update processing of the numerical item, as long as a predetermined condition, for example, a value does not fall below a predetermined value (ex. 0) is satisfied, the update processing may be concurrently applied to the same record.

To concurrently update the record by using the property of the update processing for the numerical item, a method of previously dividing the value of the numerical item into a plurality of elements (hereinafter referred to as comparative method) has been proposed. For example, when a value of the numerical item that is "count" of a record of certain products is "100", the value is divided into three elements having respective values {20, 30, 50}.

In the state where the numerical item is divided into the plurality of elements as described above, when the update processing indicating that 20 products are shipped in response to a request of a transaction, an element having a value 20 among divided elements of the numerical item "count" is locked, and remaining elements having values "30" and "50" are kept unchanged (are not locked). As a result, even when the transaction of locking the element having the value "20" is not completed, the elements having the values "30" and "50" are not locked and therefore, update processing indicating that 30 products are shipped in response to a request of another transaction can be executed without being blocked. In this case, the element having the value 30 is locked by another transaction.

As described above, in the case where an original value of the numerical item is divided into a plurality of elements, even when one transaction of locking an element among the plurality of elements is confirmed (committed) or cancelled (rolled back), it is ensured that the number of products in stock is 0 or more. Thus, exclusive control on a record-by-record basis does not have to be performed while the correctness of the update processing is kept. For this reason, a plurality of transactions of updating the same record can be concurrently performed without blocking each other.

As the number of divided values of the numerical item increases, more transactions can update the same record. However, as the number of elements increases, the data amount increases to increase resource usage. Specifically, disc usage increases. To refer to a record including the numerical item has to involve calculating a sum of values of divided elements. Calculating the sum involves accesses to data of all the elements, and the accesses to the data of all the elements on the disc involve I/O processing, temporary storage of the data in a memory, use of cache, and so on for all the elements. Consequently, I/O time increases to increase processing time of the reference processing itself. In addition, the cache efficiency lowers due to expelling of data of other processing out of the cache, delaying time for other processing.

On the other hand, when the number of divided elements is decreased to reduce the resource usage for the elements, the number of transactions that can be concurrently performed decreases. The reason is that in the comparative method, the largest number of transactions that can be concurrently performed is equal to the number of divided elements. For example, as illustrated in FIG. 1, in the case where the numerical item of each record in original data is divided into two elements, the number of transactions that can concurrently execute the update processing for the same article (same record) is two at the maximum. Accordingly, in the example illustrated in FIG. 1, article in the update processing of two transactions "shipment of 10 carrots" on the article "carrot", two elements of the numerical item of the record about the article "carrot" each are locked. Accordingly, another transaction maybe kept from executing the update processing of the record about the article "carrot".

Figure 2:
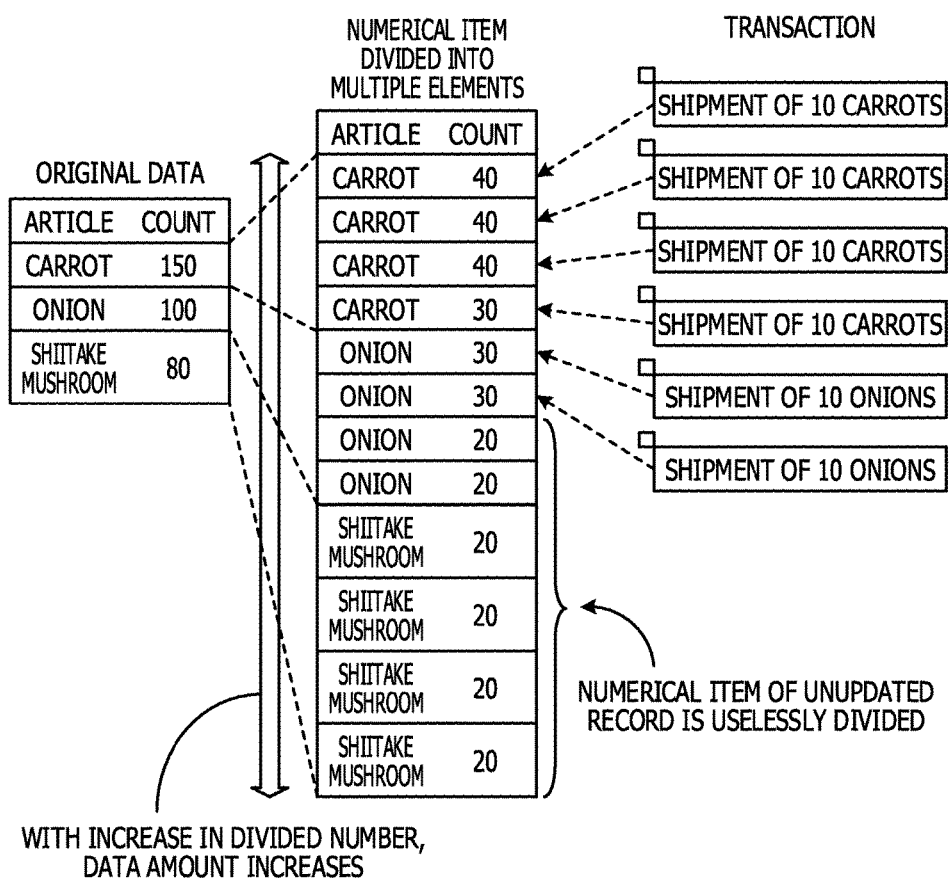

Since how and which record is concurrently updated may not be recognized before reception of the update request of a transaction, the comparative method preferably divides all records in the same manner. For example, to concurrently execute four update processings at the maximum, as illustrated in FIG. 2, the numerical item of each record in original data may be preferably divided into four elements. Accordingly, when the number of records is large or the large number of transactions concurrently performed are desired, the problem that the resource usage increases becomes apparent. At a moment, in some records, the number of update processings concurrently executed may reach the maximum number ("onion" in the example in FIG. 2), and in other records, no update processing is executed ("shiitake mushroom" in the example in FIG. 2). Despite that update processing is not executed, when the numerical item is divided into a plurality of elements, a resource is uselessly consumed. That is, even for a seldom updated record, cost as an increase in resource usage occurs even though the division produces only a small advantageous effect.

Figure 3:
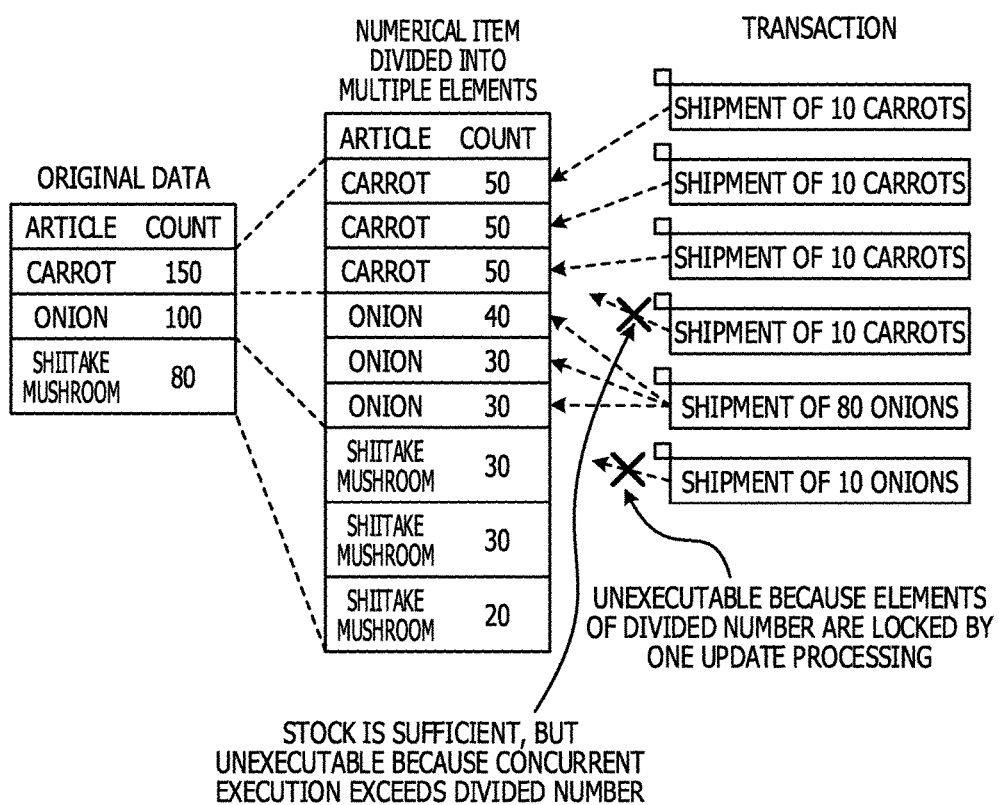

For example, as illustrated in FIG. 3, when the numerical item (count "150") of the record of the article "carrot" is divided into three elements having respective values {50, 50, 50}, the update processing can be concurrently executed with three transactions at the maximum. However, when three transactions each execute the update processing of "shipment of 10 carrots", another transaction is disabled to execute the update processing even though the stock still has products that can be further shipped (here, further 120 products can be shipped).

For example, as illustrated in FIG. 3, when the numerical item (count "100") of the record of the article "onion" is divided into three elements having respective values {40, 30, 30}, it is assumed that the update processing of "shipment of 80 onions" is requested by the transaction. In this case, since the elements are selected such that the sum of the values of the numerical item "count" reaches 80 and are locked, all of the elements are locked after all. In such case, despite that the numerical item is divided into three elements, only one update processing can be concurrently executed.

Such problem occurs because which record, and when and how (subtracted or added count) the record is updated is not recognized in advance. Thus, in this embodiment, to solve the problem, the numerical item is not previously divided, but elements are dynamically generated according to a request.

Japanese Laid-open Patent Publication No. 10-91489 describes a method of dividing and storing one record. According to the method, a record of large size is physically divided into records of small size, and the value of the numerical item of the record is not divided (semantically divided). For this reason, according to the method described in Japanese Laid-open Patent Publication No. 10-91489, when the update processings of additions and subtractions of values are concurrently executed by a plurality of transactions, the correctness of the update processings may not be maintained.

Each of the embodiment will be described below in detail.

<First Embodiment>

Figure 4:
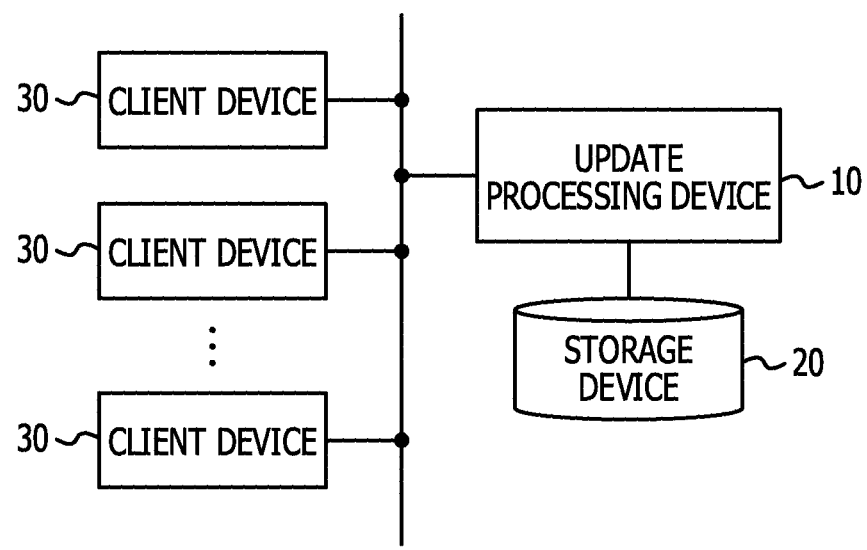
FIG. 4 illustrates schematic structure of a system.

Details of an update processing device in accordance with First embodiment will be described below. As illustrated in FIG. 4, the update processing device 10 in First embodiment is coupled to each of a plurality of client devices 30 and a storage device 20.

Figure 5:
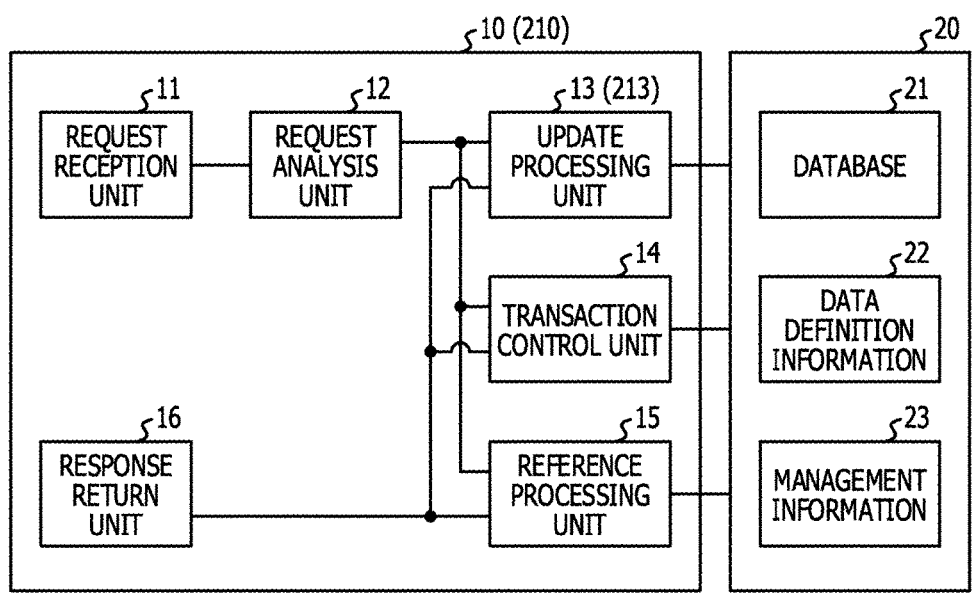
FIG. 5 is a functional block diagram illustrating an update processing device in accordance with First and Second embodiments.

In the storage device 20, various types of information is stored in a database 21 that stores data to be processed (refer to FIG. 5 as well). The storage device 20 may be provided in the update processing device 10, or may be provided separately from the update processing device 10. The storage device 20 may be a portable storage medium such as a CD-ROM, a DVD-ROM, and an USB memory.

The client devices 30 each may be a device such as a personal computer (PC), a notebook PC, a portable terminal, and a smart phone. An application using the data stored in the database 21 runs on the client device 30.

The update processing device 10 functions as a database management system that manages the database 21 stored in the storage device 20. Specifically, the update processing device 10 receives a request of a processing on the database 21 stored in the storage device 20 from the application running on the client device 30, executes the processing on the database 21, and returns a processing result to the client device 30. In this embodiment, it is assumed that a request of the transaction processing is received from the client device 30.

As illustrated in FIG. 5, the storage device 20 stores the database 21, data definition information 22, and management information 23. The database 21 has a plurality of tables, and each of the tables has a plurality of records. The records each have a plurality of items (rows, columns), and a value of defined data type is stored in each item. The data definition information 22 is information such as table names of the tables in the database 21 and data type of each item in each table. In this embodiment, especially, the numerical item has to be identified. Thus, for the item that stores the above-mentioned value of cardinality, the specific data type indicating the numerical item, or the data type indicating the item that stores the value of cardinality as additional information of general numerical item is defined. The management information 23 is identification information (transaction ID) assigned to each transaction or information on the state of each element (details will be described later).

FIG. 5 is a functional block diagram of the update processing device 10 in accordance with First embodiment. The update processing device 10 includes a request reception unit 11, a request analysis unit 12, an update processing unit 13, a transaction control unit 14, a reference processing unit 15, and a response return unit 16.

The request reception unit 11 receives a request of transaction processing for the record stored in the database 21 from the client device 30, and passes the received request to the request analysis unit 12. The request includes record identification information that identifies a record to be processed, for example, a value of a main key of the record, and identification information (record ID) of the record. The request includes item identification information that identifies an item to be updated in the record to be updated, for example, an item name and a row number corresponding to the item. The request includes processing content information that identifies processing for the item to be processed. In the case where the transaction ID is assigned, the request also includes the transaction ID of the transaction to which the update processing executed in response to the request belongs.

As described above, in this embodiment, elements are dynamically generated for the update processing about the numerical item. Examples of the update processing about the numerical item include addition and subtraction to and from the value of the numerical item. The request of addition or subtraction for the numerical item includes, for example, processing content information "A−=10" when 10 is subtracted from a value of a numerical item A, and "A+=10" when 10 is added to the value of the numerical item A.

The request analysis unit 12 analyzes the type of the request from the client device 30 based on the processing content information included in the passed request. In the case of an update request to update the record stored in the database 21, the request analysis unit 12 passes the request to the update processing unit 13. In the case of a transaction control request to control start, confirmation, and cancel the transaction, the request analysis unit 12 passes the request to the transaction control unit 14. In a reference request to refer to the records stored in the database 21, the request is passed to the reference processing unit 15.

The update processing unit 13 identifies the record and item to be updated based on the record identification information and the item identification information in the passed update request, and executes the update processing corresponding to the processing content information included in the update request. At this time, referring to the data definition information 22, the update processing unit 13 determines whether or not the item to be updated is the numerical item.

Figure 6:
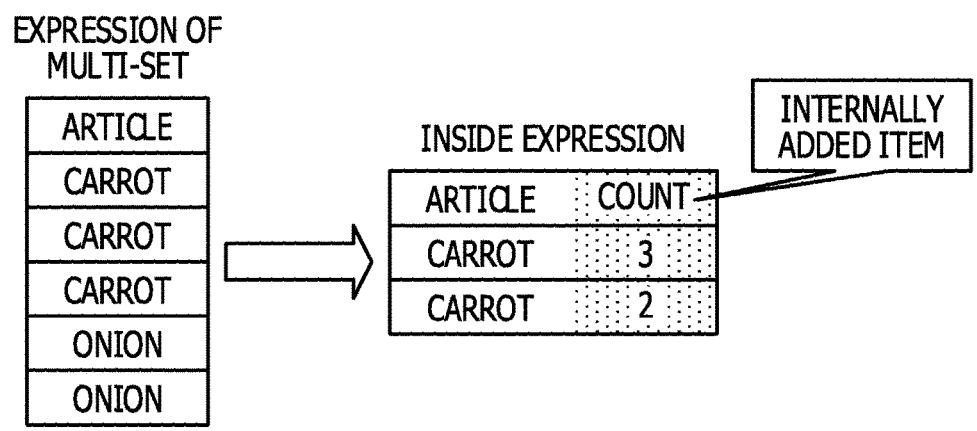
FIG. 6 is a view illustrating a multi-set of record.

The update processing unit 13 may determine whether or not the item to be updated is the numerical item by referring to the data definition information 22, but the database management system also may determine whether or not the item to be updated is the numerical item based on the nature of the item internally added. Specifically, as illustrated in FIG. 6, the database management system automatically checks the content of the stored record, physically collects records having the same content together in one record, and compresses the record to have the content and count (cardinality). In this case, even when the user does not define the item of the count as the numerical item, the item can be determined as the numerical item.

When the item to be updated is the numerical item and the content of the update processing for the numerical item is addition or subtraction, the update processing unit 13 generates an element corresponding to the update processing as an element of the numerical item, and applies the update processing on the generated element.

Figures 7A, 7B, 7C:
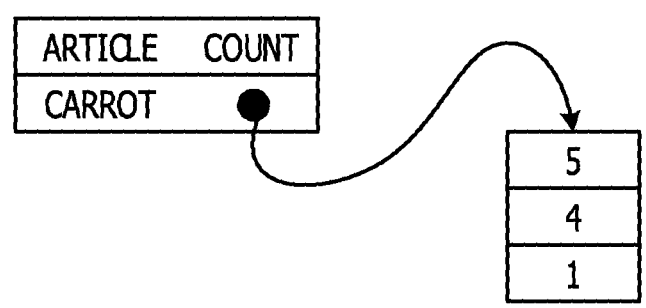
FIGS. 7A, 7B, and 7C are views illustrating an element form.

As illustrated in FIG. 7A, as one element form, an identifier of the record can be associated with each element. In the example illustrated in FIG. 7A, the item "article" in the database that handles one article as one record is used as the identifier of the record. As another element form, as illustrated in FIG. 7B, in the record, the numerical item can have a plurality of elements. As illustrated in FIG. 7C, a region for generated elements is prepared separate from the original record, and the elements of the numerical item of the record can be referred to from the original record by using a pointer or the like. This embodiment uses the form illustrated in FIG. 7A. The element form is not limited to the above-mentioned examples, and the value of the element only has to represent the value of the numerical item of the record. In this embodiment, one article is handled as one record, but each element may be handled as each record.

When the update processing is "addition", the update processing unit 13 generates an element having an added value. The update processing unit 13 sets the state of the generated element to "during addition" indicating the element is added when the transaction is confirmed, but the transaction is unconfirmed. The element having the state "during addition" is in the locked state, and the update processing of another transaction is blocked. Although described in detail later, the state of the element in which lock is released by confirming the transaction is set to "valid" or "invalid". The element having the state "valid" can be subjected to the update processing of a transaction. The element having the state "invalid" may not be subjected to the update processing of a transaction.

The update processing unit 13 acquires the transaction ID included in the request, and stores the set state and the transaction ID, which are management information 23 of the generated element, in the storage device 20.

Figure 8:
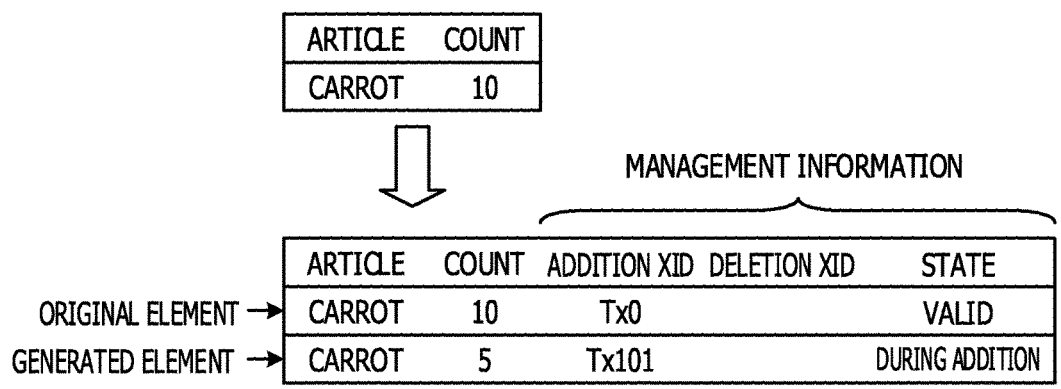
FIG. 8 is a view illustrating element generation at addition.

For example, the update processing indicating arrival of 5 products for the article "carrot" currently having 10 products in stock is processing of adding "5" to the numerical item "count" of the record "article: carrot, count: 10" as illustrated in FIG. 8. In this case, the value "10" of the original numerical item is used as an original element, and a new element having a value "5" is generated with the original element unchanged, and the state of the element is set to "during addition". Thereby, with respect to the 10 products in stock, the transaction of which is confirmed, the update processing indicating shipment (subtraction) can be concurrently executed. Further, since the element for addition is generated irrespective of the original element, update processings indicating a plurality of arrival processings (addition) can be concurrently executed.

An "addition XID" and a "deletion XID" in FIG. 8 are a transaction ID representing the addition transaction and a transaction ID representing subtraction transaction. The generated element in the example in FIG. 8 is generated in response to a request of the update processing that belongs to the transaction of addition XID=Tx101. In FIG. 8, although each the management information 23 of element is displayed alongside each element, the management information 23 only has to be associated with the identification information that identifies the element and stored in the storage device 20, for example, may be stored in a region other than the database 21.

When the update processing is "subtraction", the update processing unit 13 generates an element having a subtracted value, and subtracts the subtracted value from the original element. The update processing unit 13 sets the state of the generated element to "during deletion" indicating that the element is deleted when the transaction is confirmed, but the transaction is unconfirmed. The element having the state "during deletion" is in the locked state, and the update processing of another transaction is blocked. As in the case of addition, the update processing unit 13 stores the set state and the transaction ID, which are management information 23, in the storage device 20.

Figure 9:
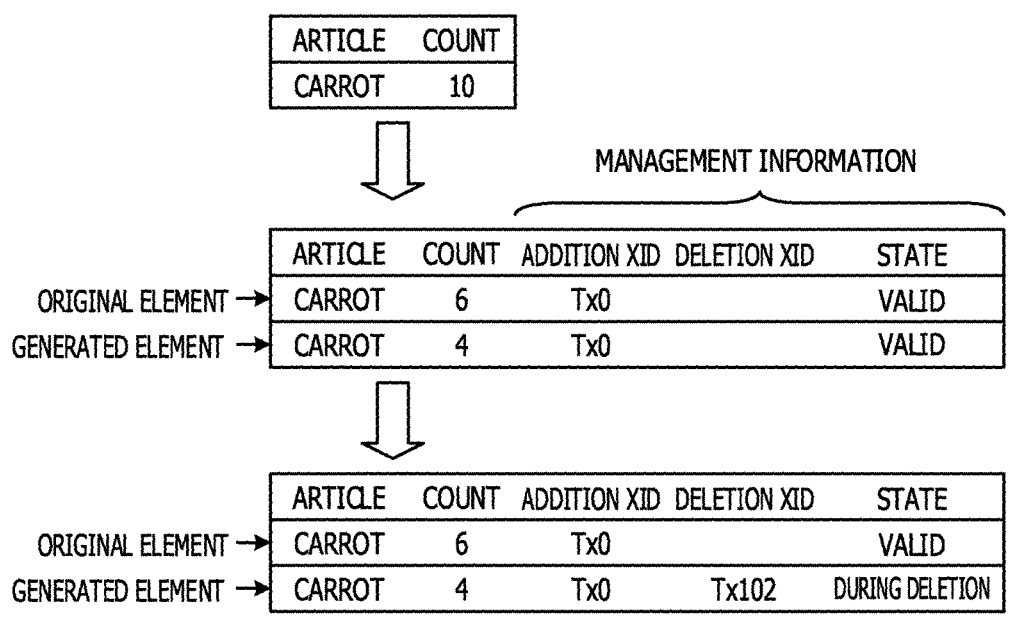
FIG. 9 and FIG. 10 are views illustrating element generation at subtraction.

For example, the update processing indicating shipment of 4 products for the article "carrot" currently having 10 products in stock is processing of subtracting "4" from the numerical item "count" of the record of the "article: carrot, count: 10" as illustrated in FIG. 9. In this case, the value "10" of the original numerical item is used as an original element, and "4" is subtracted from the original element, and a new element having a value "4" is generated. Thereby, the target record (original element) is copied, and a new record (new element) having a value corresponding to the content of the update processing is generated in the numerical item. Management information of the generated element is a copy of management information of the original element. That is, the value "10" of the original numerical item is divided into the element having the value "6" as the count after subtraction and the element having the value "4" as the subtracted value. The update processing unit 13 sets the state of the generated element to "during deletion". Thereby, with respect to remaining 6 products in stock, the update processing indicating shipment (subtraction) can be concurrently executed. As in the case of addition, the update processing of another arrival processing (addition) can be concurrently executed.

The update processing unit 13 stores the set state and the transaction ID (in the example in FIG. 9, deletion XID=Tx102) representing the subtraction transaction, which are the management information 23, in the storage device 20. The transaction ID (in the example in FIG. 9, addition XID=Tx0) copied from the original element is also stored as the management information 23. As a result, a history of this element that is added in the transaction of addition XID=Tx0 and is deleted in the transaction of deletion XID=Tx102 can be managed.

When the update processing is "subtraction", in the case where a plurality of elements are present with respect to the numerical item to be updated, the update processing unit 13 selects a plurality of elements having the state "valid" such that the sum of values is the subtracted value. Then, the update processing unit 13 sets the state of each of the selected elements to "during deletion". The elements may be randomly selected, or may be selected in chronological order or increasing order of the values by referring to the management information 23. When the sum of the values of the selected elements exceeds the subtracted value, the update processing unit 13 may use any of the selected elements as an original element, and divide the element having the subtracted value as described above.

Figure 10:
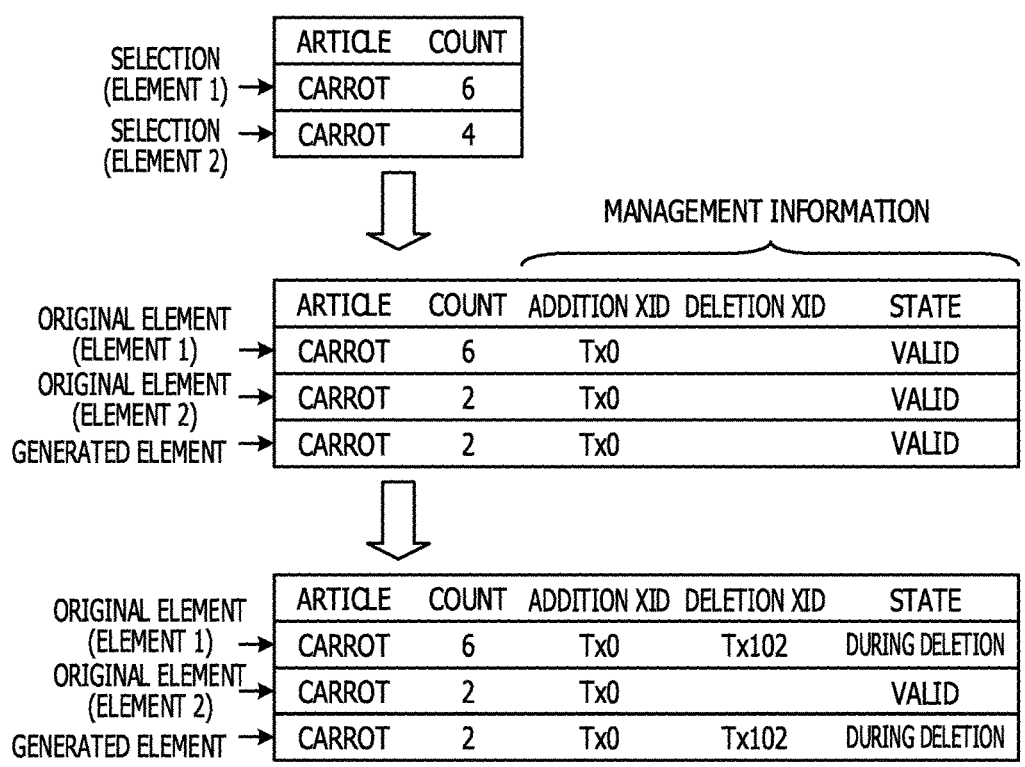

For example, referring to FIG. 10, description is provided for shipment processing for shipment of 8 carrots in the case where the numerical item "count" of the record of the article "carrot" currently having 10 products in stock has an element having a value "6" (element 1) and an element having a value "4" (element 2). As illustrated in FIG. 10, when the elements are selected until the sum of the values of the element reaches 8, element 1 and element 2 are selected. However, since the sum of the values of the two elements generates the remainder, one element (here, element 2) is divided in the above-mentioned manner, a new element having a value "2" is generated such that the sum of the value of the value of element 1 becomes 8, and the value of the element generated from element 2 is subtracted. Then, the state of each of the element having the subtracted value, that is, element 1 and the generated element is set to "during deletion".

The transaction control unit 14 determines which of "start", "confirm (commit)", and "cancel (rollback)" the type of the transaction control request is, based on the processing content information included in the passed transaction control request. When the type of the transaction control request is "start", the transaction control unit 14 assigns the transaction ID to started transaction, and notifies the transaction ID to the client device 30 through the response return unit 16. When requesting processing belonging to the same transaction, the client device 30 includes the assigned transaction ID in the request. When the transaction ID is not included in the request, the type of the transaction control request can be determined as "start". The transaction control unit 14 stores the assigned transaction ID as the management information 23 in the storage device 20.

When the type of the transaction control request is "commit", the transaction control unit 14 changes the state of the element having the state "during addition" to "valid". This release the lock set to the element. The transaction control unit 14 changes the state of the element having the state "during deletion" to "invalid". Thereby, the element is to be deleted. When changing the state of all elements that are being updated by the update processings belonging to the same transaction, the transaction control unit 14 notifies transaction confirmation completion to the response return unit 16. This ensures all update processings belonging to the same transaction to be executed.

When the type of the transaction control request is "cancel", the transaction control unit 14 deletes the element having the state "during addition", and changes the state of the element having the state "during deletion" to "valid". Consequently, the sum of the values of the elements returns to the value before addition or subtraction. When restoring all elements that are being updated by the update processings belonging to the same transaction, the transaction control unit 14 notifies transaction cancel completion to the response return unit 16. This ensures all update processings belonging to the same transaction to be unexecuted.

The transaction control unit 14 releases a lock set to the record with respect to the update processing of items other than the numerical item, and confirms or cancels the transaction.

The reference processing unit 15 acquires a record indicated by the record identification information included in the passed reference request from the database 21, and passes the record to the response return unit 16. At this time, when the acquired record includes the numerical item, and the numerical item has a plurality of elements, the reference processing unit 15 passes the sum of values of the elements. Thus, the user does not recognize that the element is divided.

The response return unit 16 returns various types of information passed from the update processing unit 13, the transaction control unit 14, and the reference processing unit 15 to the client device 30.

Figure 11:
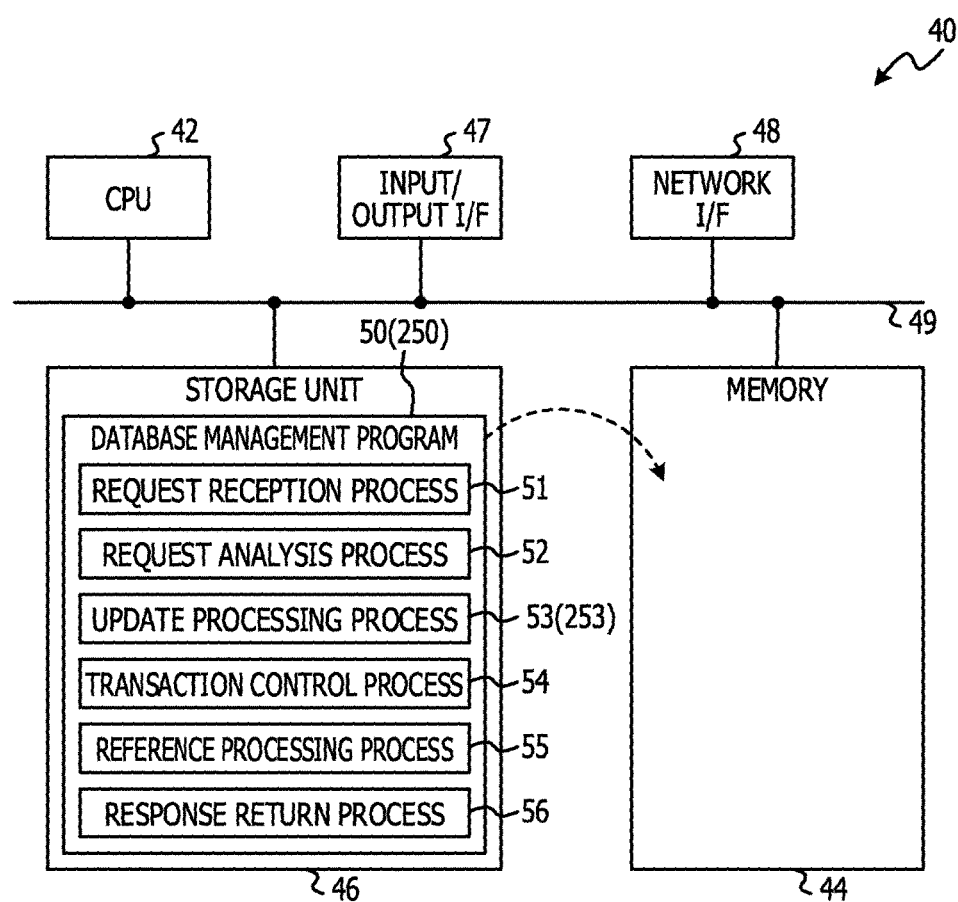
FIG. 11 illustrates schematic structure of computer that functions as the update processing device.

The update processing device 10 can be embodied as a computer 40 illustrated in FIG. 11. The computer 40 includes a central processing unit (CPU) 42, a memory 44, a nonvolatile storage unit 46, an input/output interface (I/F) 47, and a network I/F 48. The CPU 42, the memory 44, the storage unit 46, the input/output I/F 47, and network I/F 48 are interconnected via a bus 49.

The storage unit 46 may be embodied as a hard disk drive (HDD), a solid state drive (SSD), or a flash memory. A database management program 50 for allowing the computer 40 to function as the update processing device 10 is stored in the storage unit 46 as a record medium. The CPU 42 reads the database management program 50 from the storage unit 46, loads the program into the memory 44, and sequentially executes processes of the database management program 50.

The database management program 50 has a request reception process 51, a request analysis process 52, an update processing process 53, a transaction control process 54, a reference processing process 55, and a response return process 56. The CPU 42 executes the request reception process 51, thereby functioning as the request reception unit 11 illustrated in FIG. 5. The CPU 42 executes the request analysis process 52, thereby functioning as the request analysis unit 12 illustrated in FIG. 5. The CPU 42 executes the update processing process 53, thereby functioning as the update processing unit 13 illustrated in FIG. 5. The CPU 42 executes the transaction control process 54, thereby functioning as the transaction control unit 14 illustrated in FIG. 5. The CPU 42 executes the reference processing process 55, thereby functioning as the reference processing unit 15 illustrated in FIG. 5. The CPU 42 executes the response return process 56, thereby functioning as the response return unit 16 illustrated in FIG. 5. This enables the computer 40 that executes the database management program 50 to function as the update processing device 10.

The update processing device 10 may be embodied as a semiconductor integrated circuit, and in particular an application specific integrated circuit (ASIC).

Next, the action of First embodiment will be described. The update processing device 10 executes database management processing illustrated in FIG. 12.

Figure 12:
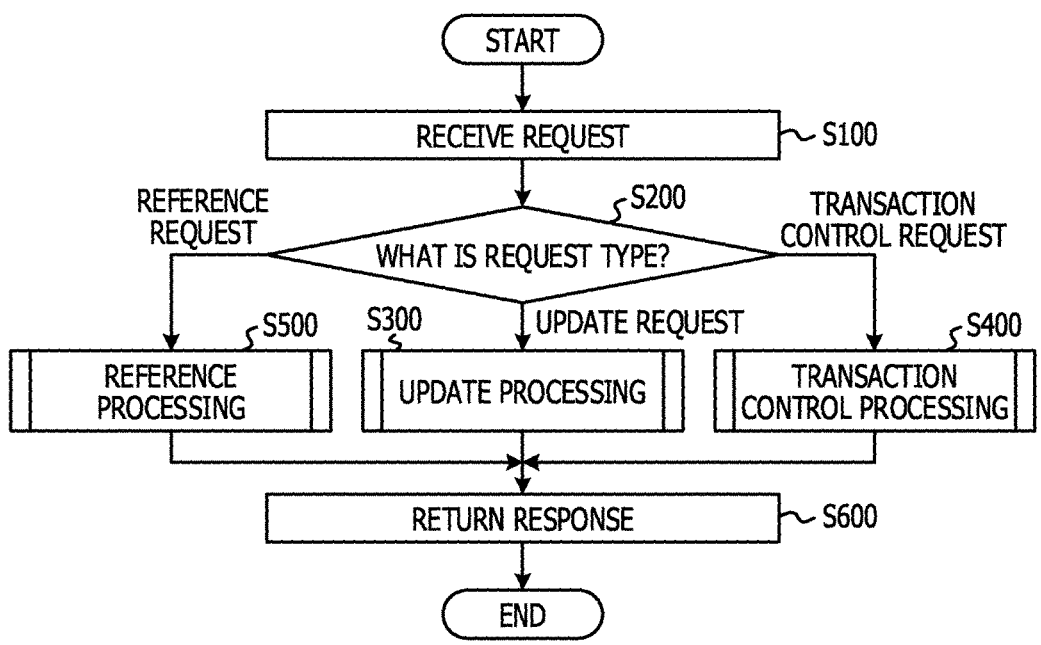
FIG. 12 is a flow chart illustrating an example of database management processing.

In Step S100 of the database management processing in FIG. 12, the request reception unit 11 receives a request of processing of the record that is transmitted from the client device 30 and stored in the database 21, and passes the received request to the request analysis unit 12. The request includes record identification information, item identification information, and processing content information of the record to be processed.

Next, in Step S200, based on the processing content information included in the passed request, the request analysis unit 12 analyzes the type of the processing request from the client device 30. When an analysis result of the request analysis unit 12 is the update request, the procedure proceeds to Step S300 and below-mentioned update processing is executed. When the analysis result is the transaction control request, the procedure proceeds to Step S400, and below-mentioned transaction control processing is executed. When the analysis result is the reference request, the procedure proceeds to Step S500, and below-mentioned reference processing is executed.

Next, in Step S600, the response return unit 16 returns various types of information indicating a result of the update processing, the transaction control processing, or the reference processing with respect to the client device 30.

Next, referring to FIG. 13, update processing executed in Step S300 in FIG. 12 will be described.

Figure 13:
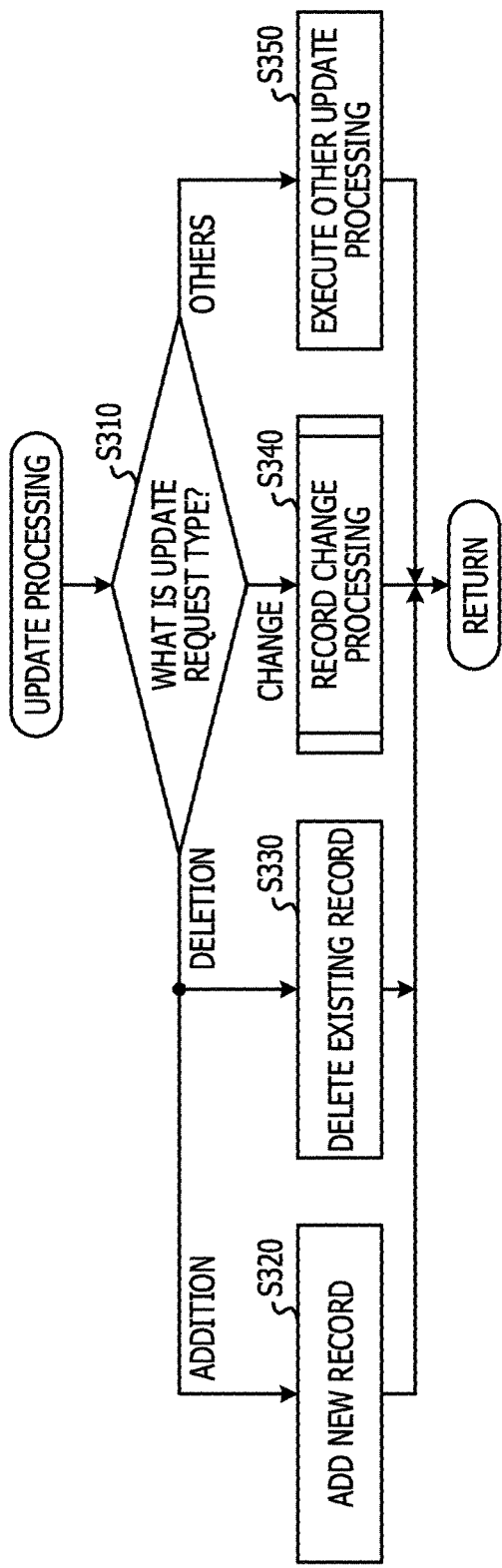
FIG. 13 is a flow chart illustrating an example of update processing.

In Step S310 of the update processing in FIG. 13, referring to the processing content information included in the update request passed from the request analysis unit 12, the update processing unit 13 determines the type of the update request. For example, when the update request described in an SQL statement includes an INSERT statement as the processing content information, the update processing unit 13 determines the type of the update request as addition of a new record to the database 21. For example, when a DELETE statement is included as the processing content information, the update processing unit 13 determines the type of the update request as deletion of an existing record in the database 21. For example, when the UPDATE statement is included as the processing content information, the update processing unit 13 determines the type of the update request as change of a designated record.

When the update processing unit 13 determines that the type of the update request is addition of the new record, the procedure proceeds to Step S320, the update processing unit 13 adds the new record according to the INSERT statement. When the update processing unit 13 determines that the type of the update request is deletion of the existing record, the procedure proceeds to Step S330, and the update processing unit 13 deletes the existing record according to the DELETE statement. When the update processing unit 13 determines that the type of the update request is change of the record, the procedure proceeds to Step S340, and below-mentioned record change processing is executed. When the update processing unit 13 determines that the type of the update request is not any of addition of the new record, deletion of the existing record, and change of the record, the procedure proceeds to Step S350, and the update processing unit 13 executes the update processing according to the processing content information. When any update processing is executed, the procedure returns to the database management processing illustrated in FIG. 12.

Next, referring to FIG. 14, the record change processing executed in Step S340 in FIG. 13 will be described.

Figure 14:
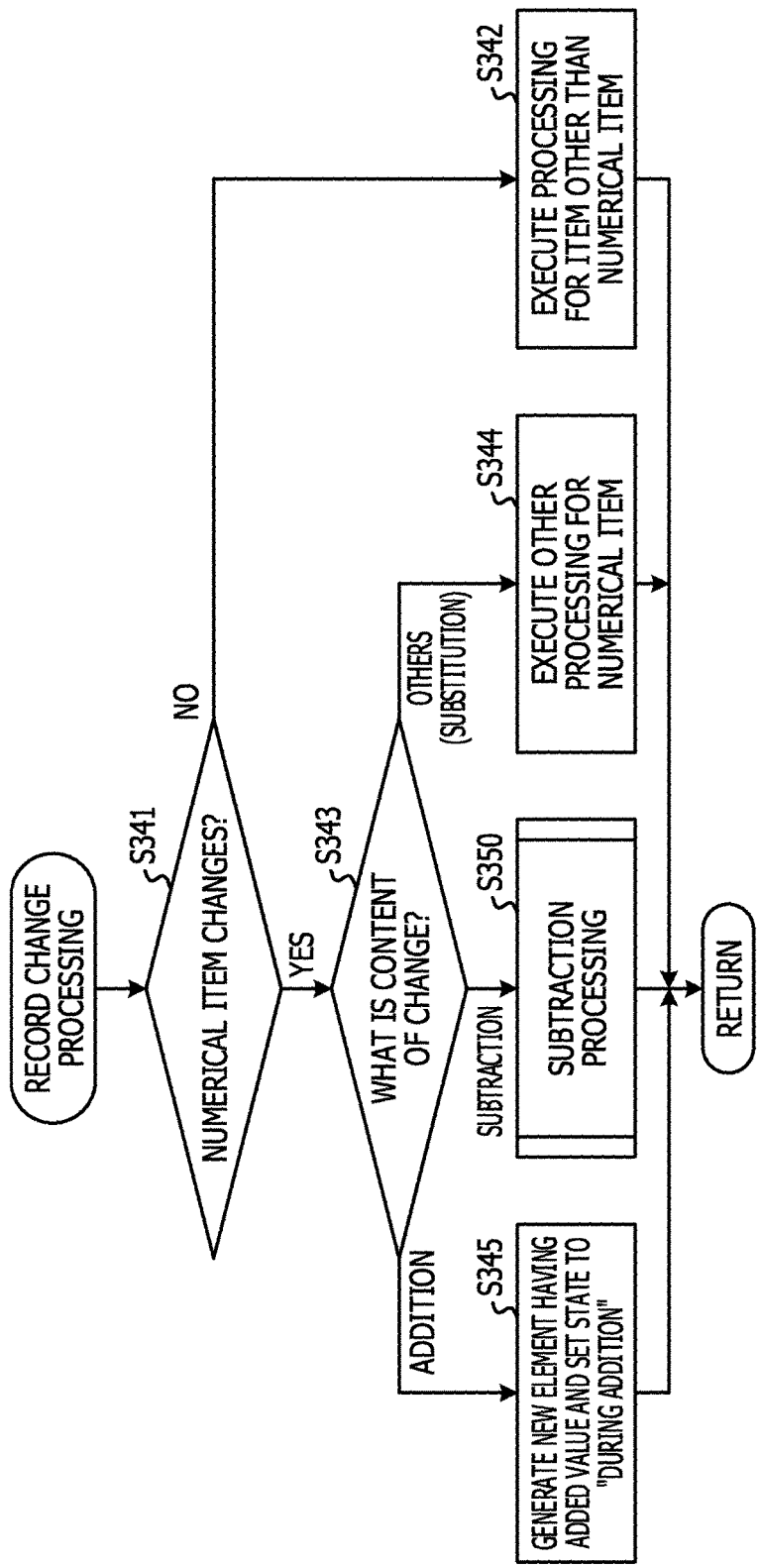
FIG. 14 is a flow chart illustrating an example of record change processing.

In Step S341 of the record change processing in FIG. 14, the update processing unit 13 identifies record and item o be updated based on the record identification information and the item identification information in the passed update request. Referring to the data definition information 22, the update processing unit 13 determines whether or not the item to be updated is the numerical item. When the item to be updated is the numerical item, the procedure proceeds to Step S343. On the other hand, when the item to be updated is not the numerical item, the procedure proceeds to Step S342, the update processing unit 13 changes the item identified based on the processing content information, and the procedure returns to the update processing in FIG. 13.

In Step S343, the update processing unit 13 determines which of addition, subtraction, and other processings the update processing for the numerical item is. In the case of the processing for the numerical item other than addition and subtraction, the procedure proceeds to Step S344. In Step S344, the update processing unit 13 executes the other processing for the numerical item. For example, when the other processing is substitution of a value into the numerical item to be updated, the update processing unit 13 sets the state of all elements of the numerical item of the record to be updated to "during deletion". Then, a new element having a substituted value is generated, and the state of the element is set to "during addition".

When the update processing for the numerical item is addition, the procedure proceeds to Step S345. In Step S345, the update processing unit 13 generates an element having an added value, and sets the state to "during addition". The update processing unit 13 stores the set state and the transaction ID, which are management information 23, in the storage device 20.

When the update processing for the numerical item is subtraction, the procedure proceeds to Step S350, and below-mentioned subtraction is executed. Any update processing is executed as record change processing, the procedure returns to the update processing in FIG. 13.

Next, referring to FIG. 15, subtraction executed in Step S350 in FIG. 14 will be described.

Figure 15:
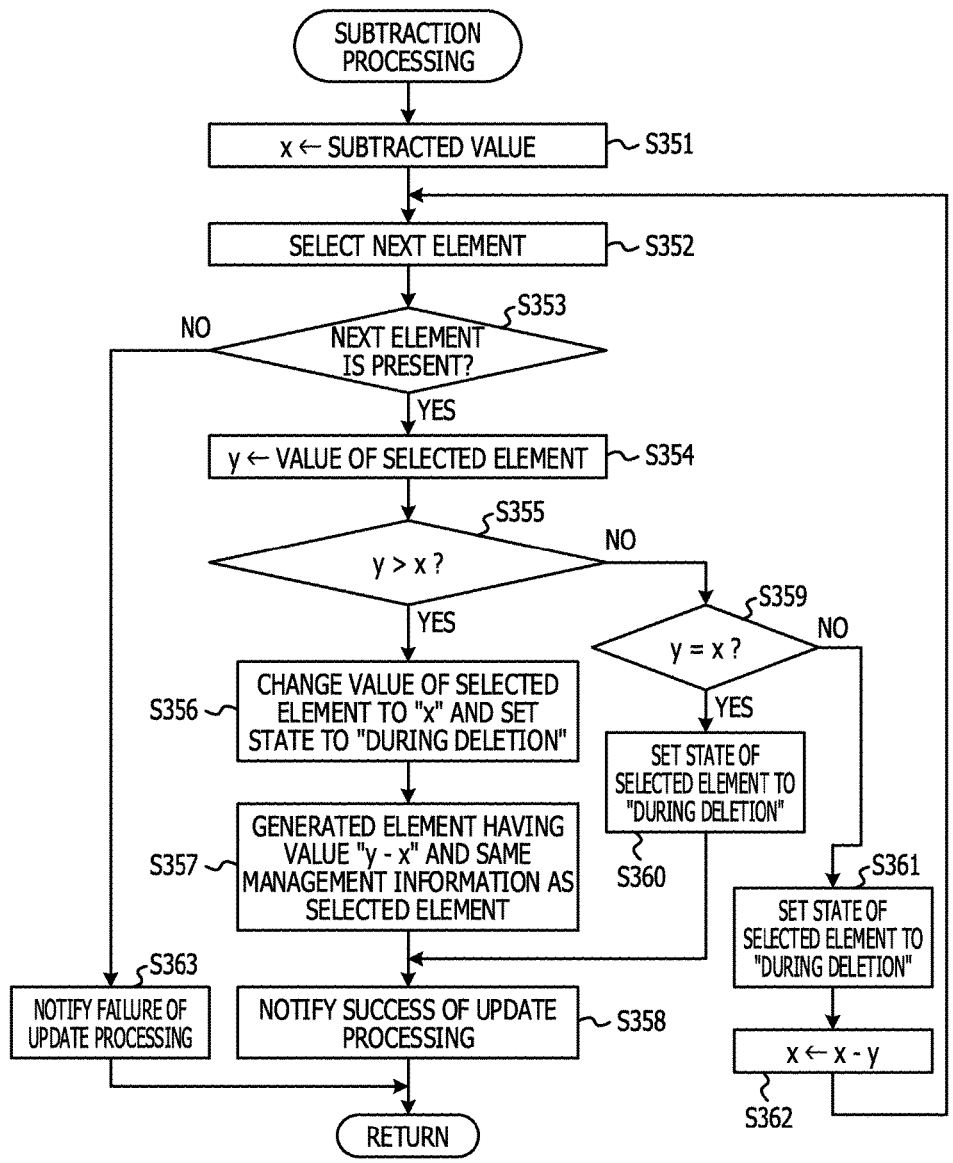
FIG. 15 is a flow chart illustrating an example of subtraction.

In Step S351 of subtraction in FIG. 15, the update processing unit 13 sets a subtracted value to a variable x. Next, in Step S352, the update processing unit 13 selects an element to be processed next from among unselected elements out of the elements having the state of the numerical item to be updated "valid". Next, in Step S353, it is determined whether or not the update processing unit 13 can select the next element in Step S352. When the update processing unit 13 can select the next element, the procedure proceeds to Step S354.

In Step S354, the update processing unit 13 sets a value of the selected element to a variable y. Next, in Step S355, the update processing unit 13 determines whether or not y is larger than x. When y is larger than x, the procedure proceeds to Step S356, and y is x or smaller, the procedure proceeds to Step S359.

In Step S356, the update processing unit 13 changes the value of the element selected in Step S352 to x (subtracted value), and sets the state of the element to "during deletion". Next, in Step S357, the update processing unit 13 generates a new element that has a value "y−x", and has the same management information as that of the selected element. The "same management information as that of the selected element" means the management information before the state is set to "during deletion" in Step S356. Next, in Step S358, the update processing unit 13 notifies success of the update processing to the response return unit 16, and procedure returns to the record change processing in FIG. 14.

In Step S359, the update processing unit 13 determines whether or not y is equal to x. When y is equal to x, the procedure proceeds to Step S360, and when y is smaller than x, the procedure proceeds to Step S361.

In Step S360, the update processing unit 13 sets the state of the selected element to "during deletion", and the procedure proceeds to Step S358. When the result in Step S355 or S359 is yes, the sum of values of the elements selected so far reaches the subtracted value. Especially when the result in Step S355 is yes, a reminder is produced, and the result in Step S359 is yes, no remainder is produced. On the other hand, when the result in Step S359 is no, the sum of values of the element selected so far does not reach the subtracted value.

In Step S361, the update processing unit 13 sets the state of the selected element to "during deletion". Next, in Step S362, the update processing unit 13 repeats the selection of the next element with respect to a value produced by subtracting the sum of values of the selected element from the subtracted value to set a variable x to "x−y", and the procedure returns to Step S352. When the remaining value is present and all elements are selected, it is determined that the next element is not present in Step S353, and the procedure proceeds to Step S363. In this case, because the element corresponding to the subtracted value is not selected, the update processing unit 13 notifies failure of the update processing to the response return unit 16 in Step S363, and the procedure returns to the record change processing in FIG. 14.

Next, referring to FIG. 16, the transaction control processing executed in Step S400 in FIG. 12 will be described.

Figure 16:
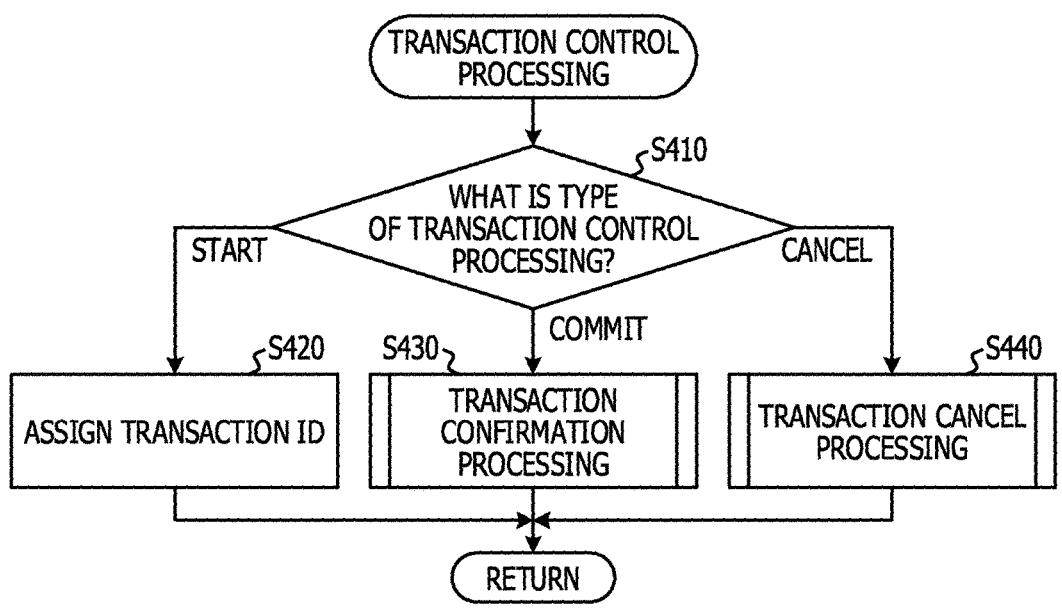
FIG. 16 is a flow chart illustrating an example of transaction control processing.

In Step S410 of the transaction control processing in FIG. 16, the transaction control unit 14 determines the type of the transaction control request based on the processing content information included in the passed transaction control request. The type is "start", "confirmation", or "cancel". For example, when the transaction control request described in an SQL statement includes a BEGIN statement indicating the start of the transaction control processing as the processing content information, the type of the transaction control request is determined as "start". When the transaction control request does not include the transaction ID, the type of the transaction control request may be determined as "start". For example, when a COMMIT statement is included as the processing content information, the transaction control unit 14 determines the type of the transaction control request as "confirmation". For example, when a ROLLBACK statement is included as the processing content information, the transaction control unit 14 determines the type of the transaction control request as "cancel".

When the transaction control unit 14 determines the type of the transaction control request as "start", the procedure proceeds to Step S420, and the transaction control unit 14 assigns a transaction ID to the started transaction. Then, the transaction control unit 14 notifies the assigned transaction ID to the response return unit 16. When the transaction control unit 14 determines the type of the transaction control request as "confirmation", the procedure proceeds to Step S430, and below-mentioned transaction confirmation processing is executed. When the transaction control unit 14 determines the type of the transaction control request as "cancel", the procedure proceeds to Step S440, and below-mentioned transaction cancel processing is executed. When any transaction control processing is executed, the procedure returns to the database management processing illustrated in FIG. 12.

Next, referring to FIG. 17, transaction confirmation processing executed in Step S430 in FIG. 16 will be described.

Figure 17:
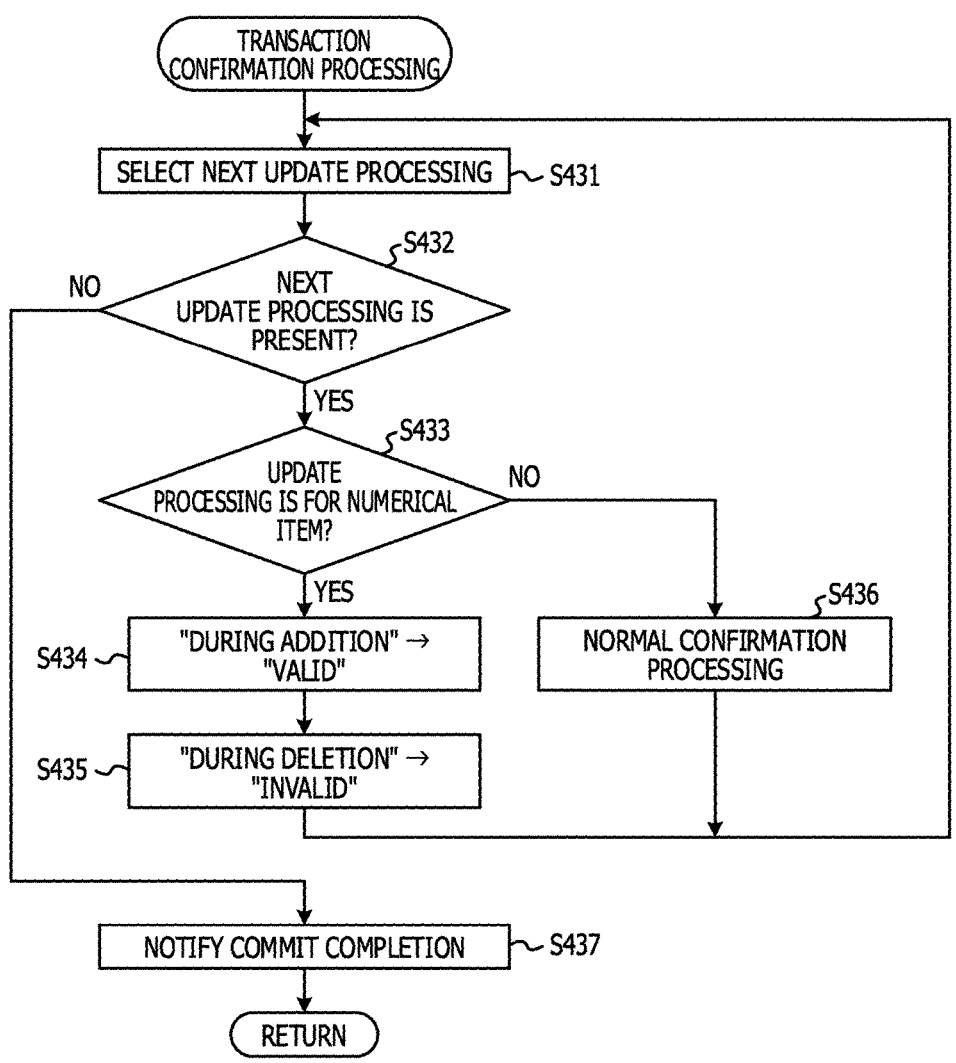
FIG. 17 is a flow chart illustrating an example of transaction confirmation processing.

In Step S431 of the transaction confirmation processing in FIG. 17, the transaction control unit 14 selects the update processing to be processed next from among updated update processings belonging to the transaction having the transaction ID included in the transaction control request. Next, in Step S432, it is determined whether or not the transaction control unit 14 can select the next update processing in Step S431. When the next update processing can be selected, the procedure proceeds to Step S433.

In Step S433, the transaction control unit 14 determines whether or not the update processing selected in Step S431 is the update processing for the numerical item. When the selected update processing is the update processing for the numerical item, the procedure proceeds to Step S434, and when he selected update processing is the update processing for the item other than the numerical item, the procedure proceeds to Step S436.

In Step S434, the transaction control unit 14 changes the state of the element having the state "during addition" among the elements of the numerical item of the record to be updated to "valid". Next, in Step S435, the transaction control unit 14 changes the state of the element having the state "during deletion" among the elements of the numerical item of the record to be subjected to the selected update processing to "invalid". When the confirmation processing on all the elements of the numerical item of the record to be subjected to the selected update processing is finished, the procedure returns to Step S431.

In Step S436, with respect to the record to be subjected to the update processing, for example, normal confirmation processing of changing the state during update to the confirmed state is executed, and the processing returns to Step S431.

When The confirmation processing for all update processings belonging to the transaction having the transaction ID included in the transaction control request is finished, it is determined that the next update processing is not present in Step S432, and the procedure proceeds to Step S437. In Step S437, the transaction control unit 14 notifies transaction confirmation completion to the response return unit 16, and the procedure returns to the transaction control processing in FIG. 16.

Next, referring to FIG. 18, transaction cancel processing executed in Step S440 in FIG. 16 will be described.

Figure 18:
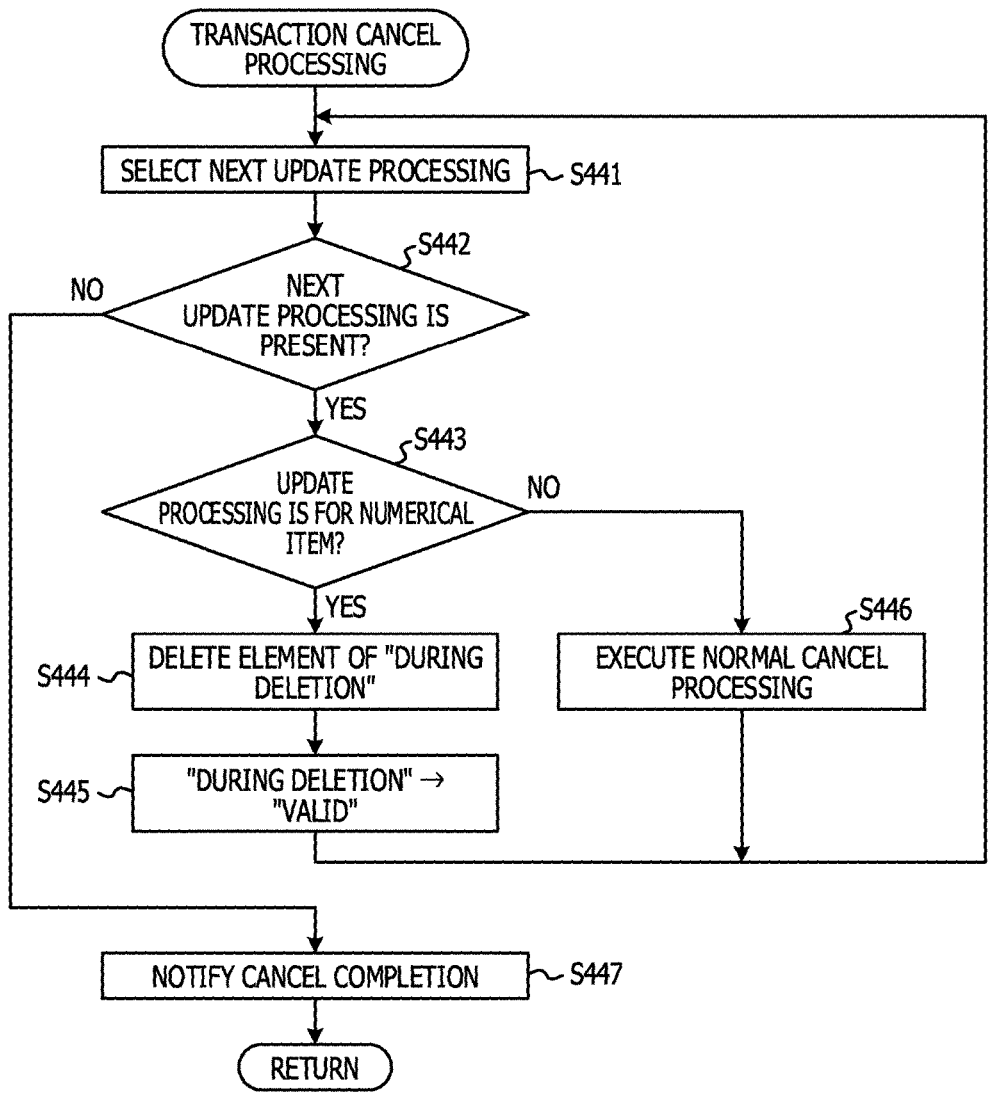
FIG. 18 is a flow chart illustrating an example of transaction cancel processing.

In Step S441 of transaction confirmation processing illustrated in FIG. 18, as in Step S431, the transaction control unit 14 selects next update processing. Next, in Step S442, as in Step S432, it is determined whether or not the transaction control unit 14 can select the next update processing in Step S441. When the transaction control unit 14 can select the next update processing, the procedure proceeds to Step S443.

In Step S443, it is determined whether or not the update processing selected by the transaction control unit 14 in Step S441 is the update processing for the numerical item. When the update processing is the update processing for the numerical item, the procedure proceeds to Step S444, and when update processing is the update processing for the item other than the numerical item, the procedure proceeds to Step S446.

In Step S444, the transaction control unit 14 deletes the element having the state "during addition" among the elements of the numerical item of the record to be subjected to the selected update processing. Next, in Step S445, the transaction control unit 14 changes the state of the element having the state "during deletion" among the elements of the numerical item of the record to be subjected to the selected update processing to "valid". When the confirmation processing of all elements of the numerical item of the record to be subjected to the selected update processing is finished, the procedure returns to Step S441.

In Step S446, with respect to the record to be subjected to the update processing, for example, normal cancel processing of returning the state during update to the state before update, and the processing returns to Step S441

When the cancel processing of all the update processings belonging to the transaction having the transaction ID included in the transaction control request is finished, determination is made in Step S442, and the procedure proceeds to Step S447. In Step S447, the transaction control unit 14 notifies transaction cancel completion to the response return unit 16, and the procedure returns to the transaction control processing in FIG. 16.

Next, referring to FIG. 19, reference processing executed in Step S500 in FIG. 12 will be described.

Figure 19:
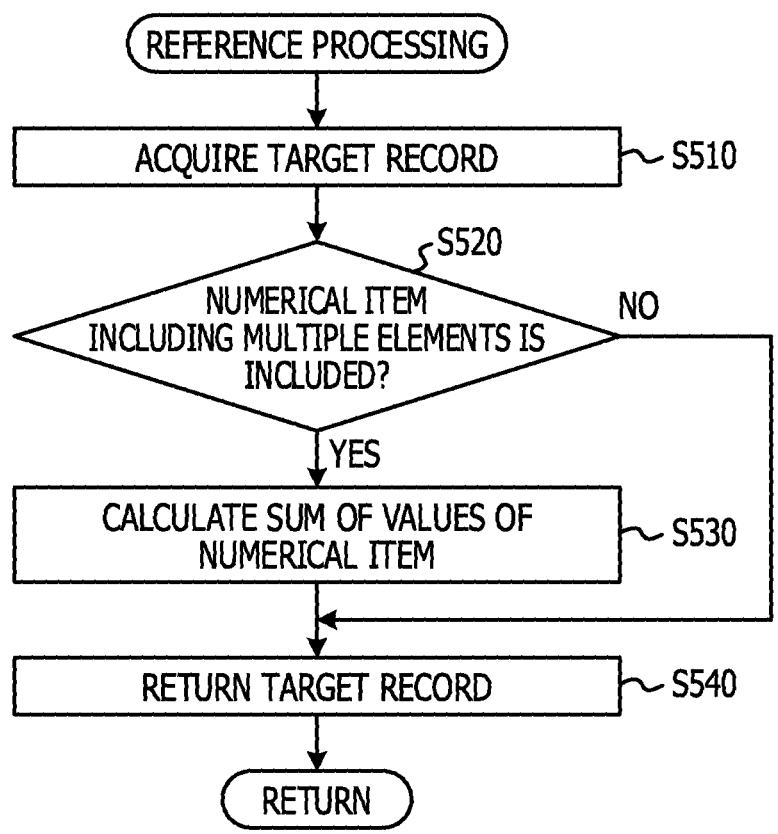
FIG. 19 is a flow chart illustrating an example of reference processing.

In Step S510 of the reference processing in FIG. 19, the reference processing unit 15 acquires a record indicated by the record identification information included in the passed reference request from the database 21. Next, in Step S520, the reference processing unit 15 determines whether or not a record including the numerical item having a plurality of elements is present in the acquired record. When such record is present, the procedure proceeds to Step S530, the reference processing unit 15 calculates a sum of values of the plurality of elements, and the procedure proceeds to Step S540.

On the other hand, when it is determined that such record is not present in Step S520, the procedure skips Step S530 and proceeds to Step S540. In Step S540, the reference processing unit 15 passes the acquired record to the response return unit 16. At this time, when the values of the plurality of elements are summed in Step S530, the reference processing unit 15 returns the sum as the value of the numerical item of the target record. Then, the reference processing is finished, and the procedure returns to the database management processing illustrated in FIG. 12.

As has been described above, in response to the request of the update processing for the numerical item, the update processing device 10 in First embodiment dynamically generate an element according to the content of the update processing. Then, by locking the generated element as the target for the update processing, remaining elements can be subjected to other update processings. This may improve concurrency of the update processings for the same record.

Because a new element is not generated for a record that is targeted for the update processing, as compared to the comparative method of previously dividing the record into a plurality of elements in consideration of the number of processings concurrently executed, the resource usage can be reduced. For example, given that the total number of records is N, and it is attempted to ensure that one record can be concurrently updated with M transactions, since it is previously unknown which record is to be updated, according to the comparative method, all records have to be previously divided into M elements, that is, N×M elements in total. On the other hand, since the element is generated in response to the update request in this embodiment, the number of the elements becomes N+M−1 at the maximum. Because N is generally larger than M, the ratio of the resource usage in this embodiment to that in the comparative method can be approximated as illustrated in following expression (1).

$$\frac{N+M-1}{N \times M} = \frac{1+\frac{M-1}{N}}{M} \approx \frac{1}{M} \qquad (1)$$

That is, in this embodiment, the resource usage can be reduced to 1/M of the resource usage in the comparative method.

To ensure that the number of elements is k times of the number of all records N (k>1) or smaller, since it is previously unknown which record is to be updated, in the comparative method, all records have to be equally divided into elements in advance. Thus, each record is divided into k elements. In this case, the number of transactions that can be concurrently performed for one record becomes k. On the other hand, because the element is generated in response to the update request in this embodiment, the number of transactions that can be concurrently performed for one record becomes kN−N+1 at the maximum. The ratio of the resource usage in this embodiment to that in the comparative method can be found according to following (2).

$$\frac{kN-N+1}{k} = N - \frac{N}{k} + \frac{1}{k} = N\left(1-\frac{1}{k}+\frac{1/N}{k}\right) \approx N\left(1-\frac{1}{k}\right) \qquad (2)$$

For example, in the case of k=2, the number of transactions that can be concurrently performed for the same record is 2 according to the comparative method, while the number in this embodiment is N+1. That is, the transactions of about N/2 times as many as the transactions in the comparative method can be concurrently performed. As k is larger, the difference becomes larger and closer to N times.

According to the conventional method such as reader/writer lock, MVCC, and copy versioning, the same record may not be concurrently updated. Thus, a succeeding transaction that attempts to update the record during update is blocked and waits until a preceding transaction is committed (confirmed) or rolled backed (cancelled) to release the lock of the record. Whether or not the preceding transaction is completed (committed) depends on the behavior of an application that requests the preceding transaction. Because the behavior of the application may not be controlled by the database management system, the database management system may not recognize when the lock of the record to be updated is released. For this reason, for example, a response to the succeeding transaction may not be controlled by the database management system.

On the other hand, in this embodiment, because an element is generated according to the update processing and only a desired element among a plurality of elements of one record is locked, even when the update processing is targeted for the same record, the update processing with respect to the unlocked element is not blocked. That is, the update processing device 10 in this embodiment, which functions as the database management system, does not have to wait lock release, the time of which is unknown, and thus, can control the response to the application that request the transaction.

To ensure the reliability of transaction processing, the database management system has properties abbreviated as ACID. The ACID is formed of initial letters of properties of Atomicity, Consistency/Correctness, Isolation, and Durability.

In the embodiment, a new element is generated according to the update processing, and the element to be updated is locked. In generating the element, the transaction is not confirmed only when the condition that the value of the numerical item is a predetermined value ("0" in the embodiment) or more is satisfied. This can keep Consistency/Correctness.

Atomicity is the property ensuring that all of the update processings belonging to the same transaction are executed, or not executed. In this embodiment, in confirming the transaction (commit), the state "during addition" of the element is changed to "valid", and the state "during deletion" of the element is changed to "invalid" for each of the elements generated in response to the request of the update processing. In cancelling the transaction (rollback), the element having the state "during addition" is deleted, and the state "during deletion" of the element is changed to "valid". This keeps atomicity.

Isolation is the property that update processing executed in a transaction is hidden from another transaction, and is also referred to as separateness or insulation. In the SQL that is a standard for query language of a relational database, some isolation levels are defined. READ COMMITTED and REPEATABLE READ are frequently used among the isolation levels. Also in this embodiment, by handling each of a plurality of elements including the generated element as one record, such isolation level can be achieved.

Specifically, at the READ COMMITTED isolation level, only the completed state is read without referring to the state during update of another transaction. To achieve the READ COMMITTED isolation level in normal database processing, for example, a mark such as a flag representing "during update" and information such as ID identifying the updating transaction are assigned to a record that is being updated. Also in this embodiment, a mark representing whether or not the element is being updated (state of "during addition" or "during deletion") and an identifier (transaction ID) of the transaction are assigned to each element. Thus, the element that is being updated (during addition or during subtraction) can be determined without referring to the element that is being updated.

Other isolation levels are REPEATABLE READ isolation level at which only data confirmed before start of the transaction is referred to, and Snapshot Isolation that is not defined in the SQL but is frequently used. To achieve these isolation levels, for example, for example, information for judging the visibility (the record is to be referred to) from the transaction is assigned to each record to achieve isolation of the transaction. Examples of the information for judging the visibility include time when the record is added or deleted and the identifier of the transaction that adds or deletes the record.

Also in this embodiment, in the transaction confirmation processing, a confirmation time when the state of each element is changed from "during addition" to "valid" and a confirmation time when the state of each element is changed from "during deletion" to "invalid" may be stored for each element, and may be used as the information for judging the visibility. This can achieve the transaction isolation level such as the REPEATABLE READ isolation level.

Durability is the property that, at completion of a transaction, a result of update processing of the transaction is permanently kept. Also in this embodiment, each element can be handled as a record in a normal database and permanently kept to achieve Durability.

<Second Embodiment>

Next, Second embodiment will be described.

The update processing device 10 in First embodiment generates a new element according to addition or subtraction. In this case, the state of the generated element becomes "valid" or "invalid" through the transaction confirmation processing or cancel processing, increasing the number of elements. In this case, even when the number of transactions concurrently performed for the same record is small, a lot of elements may be present, generating waste of resource usage.

Thus, in Second embodiment, merge processing of merging elements that can be collected together without any problem among a plurality of elements of the same record is executed.

FIG. 5 is a functional block diagram illustrating an update processing device 210 in accordance with Second embodiment. The same components as those in the update processing device 10 in First embodiment are given the same reference numerals, and detailed description thereof is omitted. The update processing device 210 includes a request reception unit 11, a request analysis unit 12, an update processing unit 213, a transaction control unit 14, a reference processing unit 15, and a response return unit 16.

The update processing unit 213 executes the merge processing of a plurality of elements of the numerical item of one record in addition to the processing of the update processing unit 13 in First embodiment.

In the merge processing, elements to be subjected to the merge processing are determined so as not to affect control of the transaction and the achievement of the ACID. For example, when the element that is being updated (the state "during addition" in addition and the state "during deletion" in subtraction) and the element that is not being updated (the state "valid" or "invalid") are merged, Atomicity and Isolation of the transaction to which the update processing generating the element that being updated belongs may not be achieved. When an element generated before start of the transaction that is being performed and an element generated after the start are merged, the REPEATABLE READ isolation level as one of the transaction isolation levels may not be achieved.

Thus, to merge the elements so as to maintain the above-mentioned transaction properties, the update processing unit 213 checks following criteria at merging. First, the update processing unit 213 determines whether or not the element is being updated. The element being updated and the element that is not being updated may not be merged. The update processing unit 213 determines whether or not the states of elements that are being updated, and transactions to which the update processings that generate the elements belong are identical to each other. When the states and the transactions are identical to each other, the elements can be merged. Further, for the elements that are not being updated, the update processing unit 213 determines whether or not the visibilities of the elements are identical to each other.

The update processing unit 213 makes the above-mentioned determination at a predetermined timing, and merges the elements determined to be capable of being merged.

Here, the timing of the merge processing will be described. The merge processing involves determining whether or not the elements can be merged, processing of checking the state of each element of the same record. When the merge processing is executed, the update processing of the elements to be subjected to the merge processing has to follow. In order to reduce additional processing costs for the merge processing, it is valid to determine whether or not the merge processing can be executed as an extension of another processing and to execute the merge processing itself as the extension.

At subtraction, the merge processing may be efficiently executed at the good timing. Subtraction includes the processing of selecting the elements until the value reaches the subtracted value, and at this timing, by determining whether or not unselected element can be merged and executing the merge processing, additional processing costs for the merge processing can be reduced.

Further, at the reference processing, the merge processing can be executed at the good timing. In the reference processing, an access to each of a plurality of elements is made to calculate the sum of values of the elements. Thus, by determining whether or not the element can be merged and executing the merge processing at each access to each element, additional processing costs for the merge processing can be reduced.

Further, the merge processing can be executed at the good timing when the update processing device 210 functioning as the database management system periodically refers to data. In the database management system, data is periodically referred to collect an unnecessary region, calculate statistical information, and so on. By determining whether or not the element can be merged and executing the merge processing at this processing, additional processing costs for the merge processing can be reduced.

When it is determined that the update processing of the record having a plurality of elements continues based on past results of the update processing, the execution of the merge processing may be deferred once. In this case, costs of additional processing for the merge processing and costs of generation of a new element for the update processing can be reduced. Then, at a timing when a load on the update processing decreases, the merge processing may be executed.

When determining that a plurality of elements that can be merged are present, as illustrated in FIG. 20, the update processing unit 213 generates a new element that has management information and visibility information (details will be described later) common to the plurality of elements, and the sum of values of the plurality of elements. Then, the update processing unit 213 deletes the original element to be merged.

As in First embodiment, the update processing device 210 may be embodied as the computer 40 illustrated in FIG. 11. A database management program 250 for allowing the computer 40 to function as the update processing device 210 is stored in the storage unit 46 as the record medium. The CPU 42 reads the database management program 250 from the storage unit 46, loads the program into the memory 44, and sequentially executes processes of the database management program 250.

The database management program 250 has a request reception process 51, a request analysis process 52, an update processing process 253, a transaction control process 54, a reference processing process 55, and a response return process 56. The CPU 42 executes the update processing process 253, thereby functioning as the update processing unit 213 illustrated in FIG. 5. Other processes are the same as those in First embodiment. This enables the computer 40 that executes the database management program 250 to function as the update processing device 210.

The update processing device 210 may be embodied as a semiconductor integrated circuit, and in particular, an ASIC.

Next, the action in Second embodiment will be described. As in First embodiment, the update processing device 210 executes the database management processing illustrated in FIG. 12. In Step S434 and S435 of the transaction confirmation processing in FIG. 17, the time when the state of each element is changed is stored in the storage device 20 as the confirmation time for each element. The confirmation time is used as visibility information for achieving the REPEATABLE READ isolation level. Then, at the above-mentioned predetermined timing, the update processing device 210 executes the merge processing illustrated in FIG. 21. Here, in the interest of simplicity of description, the merge processing of determining whether or not an element A and an element B can be merged and merging the element A and the element B if possible is described.

Figure 21:
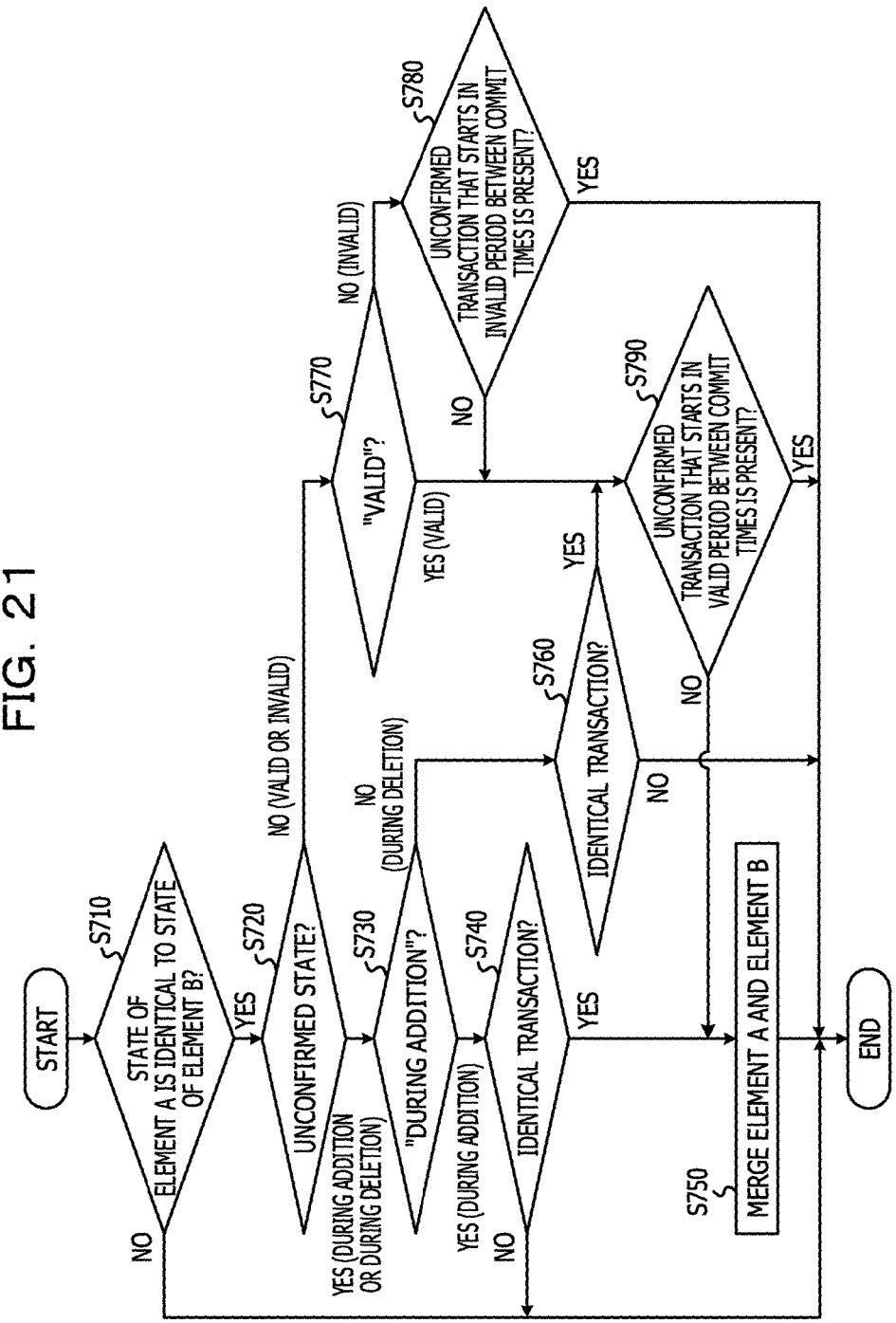
FIG. 21 is a flow chart illustrating an example of the merge processing.

In Step S710 of the merge processing in FIG. 21, it is determined whether or not the states of the element A and the element B of the numerical item of the same record are identical to each other. When the states of the two elements are both "during addition", "during deletion", "valid", or "invalid", the procedure proceeds to Step S720, and when the states of the two elements are different from each other, the elements are not be merged, and the merge processing is finished.

In Step S720, the update processing unit 213 determines whether or not the states of the two elements are unconfirmed, that is, "during addition" or "during deletion". When the states of the two elements are unconfirmed states, the procedure proceeds to Step S730, and when the states are confirmed, that is, "valid" or "invalid", the procedure proceeds to Step S770.

In Step S730, the update processing unit 213 determines whether or not the states of the two elements are "during addition". In the case of "during addition", the procedure proceeds to Step S740, the update processing unit 213 refers to the transactions ID of the two elements to determine whether or not the transactions belonging to the update processings that generate the two elements are identical to each other. When a result of the determination is yes, the two elements are identical to each other since both their states and transactions are identical to each other and therefore, the update processing unit 213 determines that the element A and the element B can be merged, and the procedure proceeds to Step S750. On the other hand, when it is determined that the transactions are different from each other in Step S740, the two elements are not merged, and the merge processing is finished.

When a result of Step S730 is no, that is, the states of the two elements are "during deletion", the procedure proceeds to Step S760, and as in Step S740, the update processing unit 213 determines whether or not the transactions of the two elements are identical to each other. When the transactions are identical to each other, the procedure proceeds to Step S790, and when the transactions are different from each other, the two elements are not merged, and merge processing is finished.

In Step S720, when it is determined that the states of the two elements are confirmed states and the procedure proceeds to Step S770, the update processing unit 213 determines whether or not the states of the two elements are "valid". When the states are "valid", the procedure proceeds to Step S790, and when the states are "invalid", the procedure proceeds to Step S780.

In Step S780 and S790, it is determined whether or not the visibilities of the two elements are identical to each other. That the visibilities are identical to each other means that only transactions in which both elements are visible or both elements are invisible are present. For example, when the transaction isolation level is the READ COMMITTED, the element can be subjected to the update processing of the transaction, that is, the state of the element is "valid". "Invisible" means that the element may not be subjected to the update processing of the transaction, that is, the state of the element is during update or "invalid".

Figure 22:
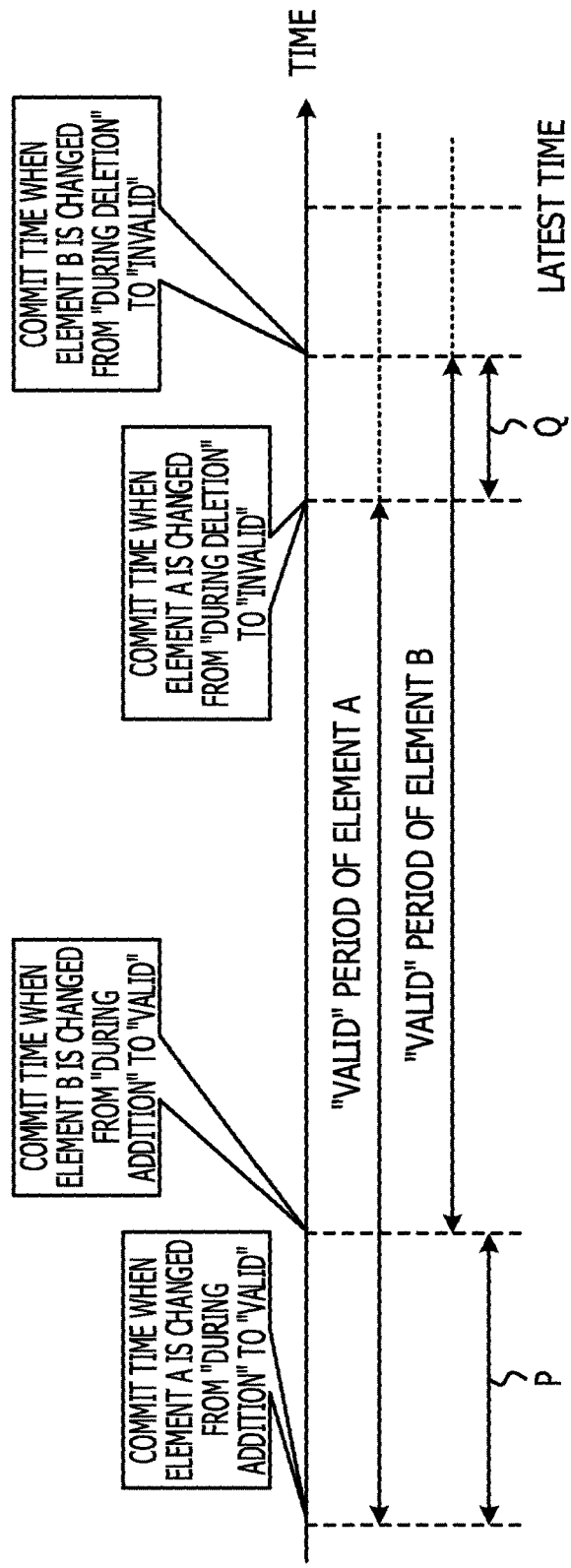
FIG. 22 is a view illustrating determination of visibility of elements.

On the precondition that the REPEATABLEREAD isolation level is achieved as the transaction isolation level, the transaction refers to only the state confirmed before start of the transaction. Accordingly, as illustrated in FIG. 22, in the transaction that starts in a period P from the confirmation time when the state of the element A is changed from "during addition" to "valid" to the confirmation time when the state of the element B is changed from "during addition" to "valid", the element A is visible, and the element B is invisible. In the transaction that starts in a period Q from the confirmation time when the state of the element A is changed from "during deletion" to "invalid" to the confirmation time when the state of the element B is changed from "during deletion" to "invalid", the element A is invisible, and the element B is visible.

Accordingly, when the transaction that starts in the period P or Q is present, the visibilities of the element A and the element B are not identical to each other. However, when the transaction that starts in the period P or Q has been confirmed, the transaction does not view any element at this time and therefore, may be excluded.

Returning to the description of the merge processing with reference to FIG. 21, in Step S780, the update processing unit 213 determines whether or not an unconfirmed transaction that starts in the period between the confirmation times when the states of the two elements are changed to "invalid" (period Q in FIG. 21) is present. When the transaction is present, the visibilities of the two elements are not identical to each other, the two elements are not merged, and the merge processing is finished. When the transaction is not present, the procedure proceeds to Step S790.

In Step S790, the update processing unit 213 determines whether or not an unconfirmed transaction that starts in the period between the confirmation times when the states of the two elements are changed to "valid" (period P in FIG. 21). When the transaction is present, the visibilities of the two elements are not identical to each other, the two elements are not merged, and the merge processing is finished. When the transaction is not present, the update processing unit 213 determines that the visibilities of the two elements are identical to each other, and the procedure proceeds to Step S750.

In Step S750, the update processing unit 213 generates a new element that has management information (transaction ID and state) and visibility information (confirmation time) common to the element A and the element B, and the sum of values of the element A and the element B. Then, the update processing unit 213 deletes the element A and the element B to finish the merge processing.

Although the two elements are merged in the above-mentioned merge processing, three or more elements may be merged in the same manner.

As has been described above, in the update processing device 210 in Second embodiment, the elements having the same states and transactions, and the elements having the same visibilities are merged, suppressing an increase in the number of elements, in turn, the resource usage.

In Second embodiment, the REPEATABLEREAD isolation level is used as the transaction isolation level, and the confirmation time of each element in the transaction confirmation processing is also used as the visibility information, but the isolation level is not limited to this. When the isolation level is strict, whether or not elements are merged may be determined based on whether or not the states and transactions are identical to each other.

Figure 23:
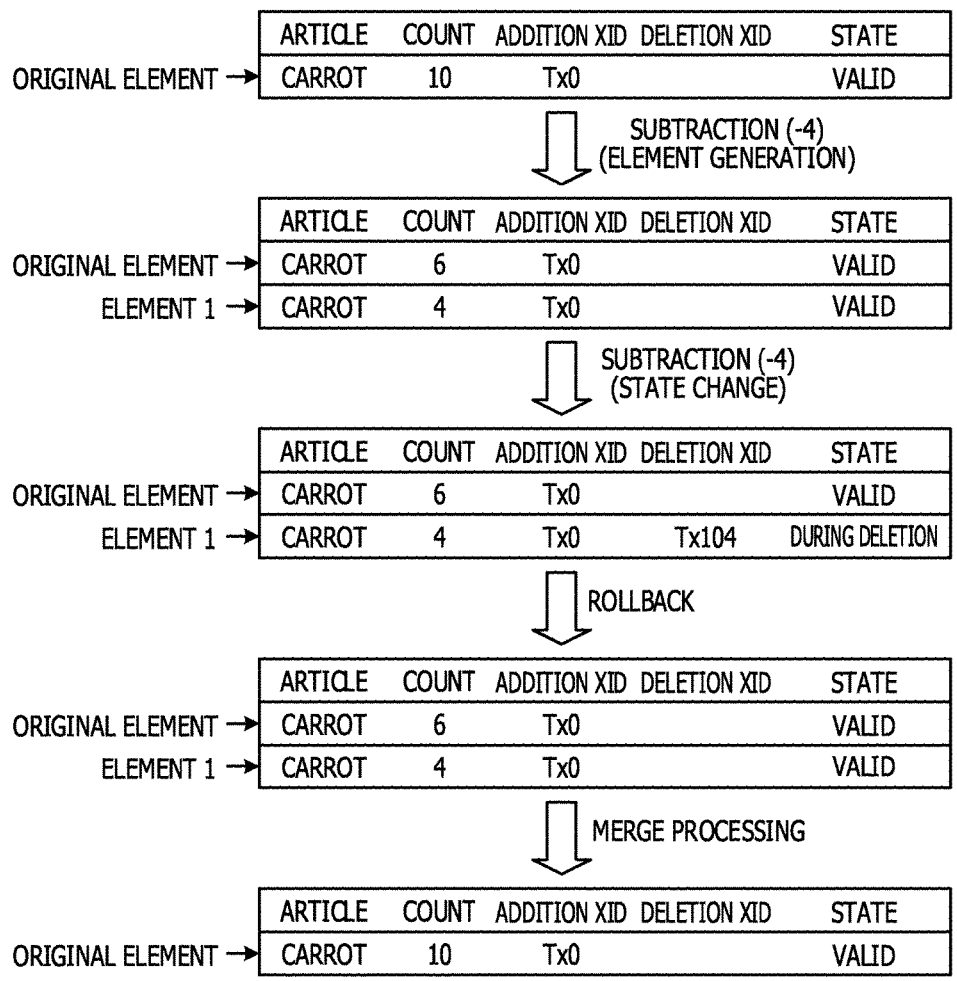
FIG. 23 is a view illustrating the merge processing.

For example, as illustrated in FIG. 23, when subtraction is made with respect to the original element, and the transaction is cancelled (rollback), the element generated from the subtraction (element 1) and the original element have the same state and transaction. Thus, it is determined that the original element and the element 1 can be merged. As a result, the element 1 generated according to the subtraction is not left behind after rollback, suppressing an increase in the number of elements.

Although an increase in the number of elements is reduced by merging the elements in Second embodiment, the number of elements can be reduced by any suitable method other than merging.

Figure 24:
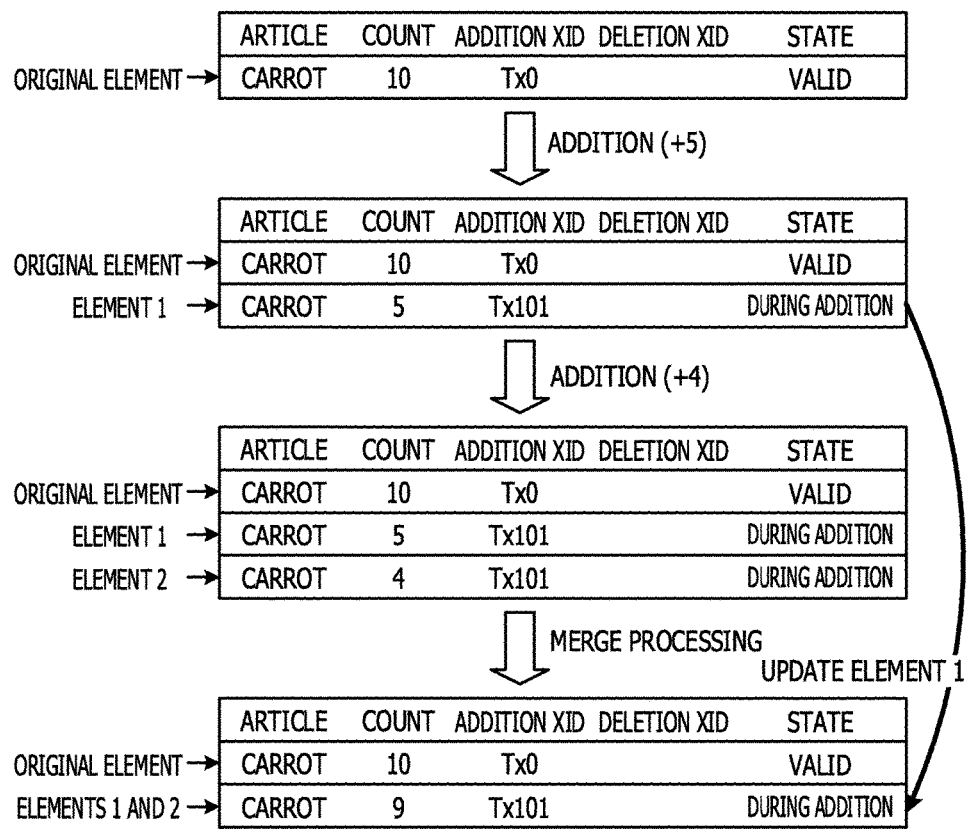
FIG. 24, FIG. 25, and FIG. 26 are views illustrating other methods for suppressing an increase in the number of elements.

For example, considering that additions to the same record are made multiple times by the update processings belonging to the same transaction. For example, as illustrated in FIG. 24, when addition of five and addition of five are made in the same transaction (addition XID=Tx101), new element 1 and element 2 are generated for each addition. The element 1 and the element 2 have the same state and transaction and thus, are merged. In this case, when the addition of four is made in the state where the element 1 generated by the addition of five is present, second addition may be made by updating the value "5" of the element 1 to the sum of "5" and "4" rather than generating a new element in making the addition of four.

Figure 25:
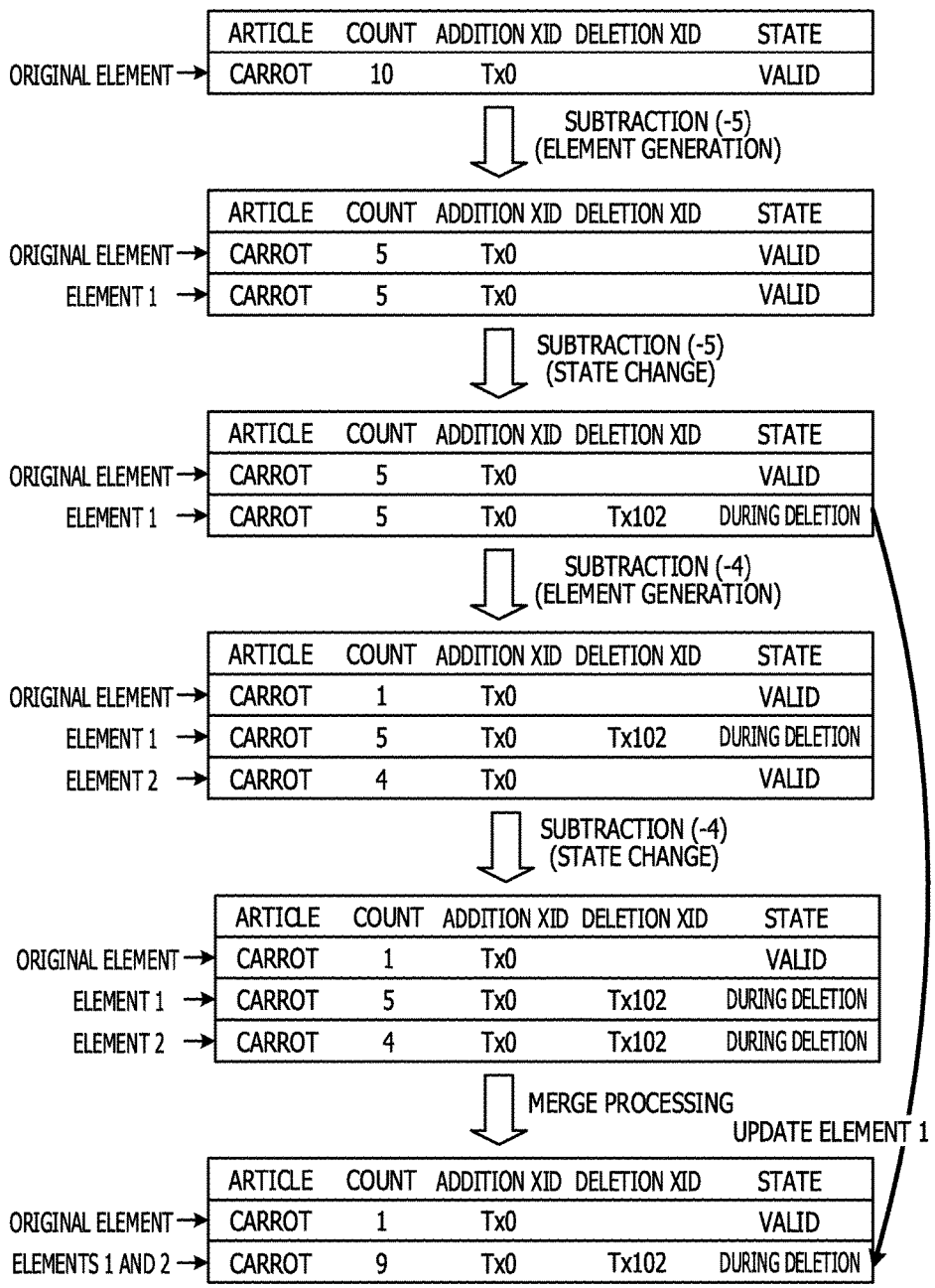

For example, considering that subtractions from the same record are made multiple times by the update processings belonging to the same transaction. For example, as illustrated in FIG. 25, when subtraction of five and subtraction of four are made in the same transaction (deletion XID=Tx102), new element 1 and element 2 are generated for each subtraction. The element 1 and the element 2 have the same state and transaction and thus, are merged. In this case, when subtraction of four are made in the state where the element 1 generated by subtraction of five is present, the value "4" subtracted from the original element may be transferred to the element 1. That is, second subtraction may be made by updating the value "5" of the element 1 to the sum of the value and the subtracted value (5+4).

Figure 26:
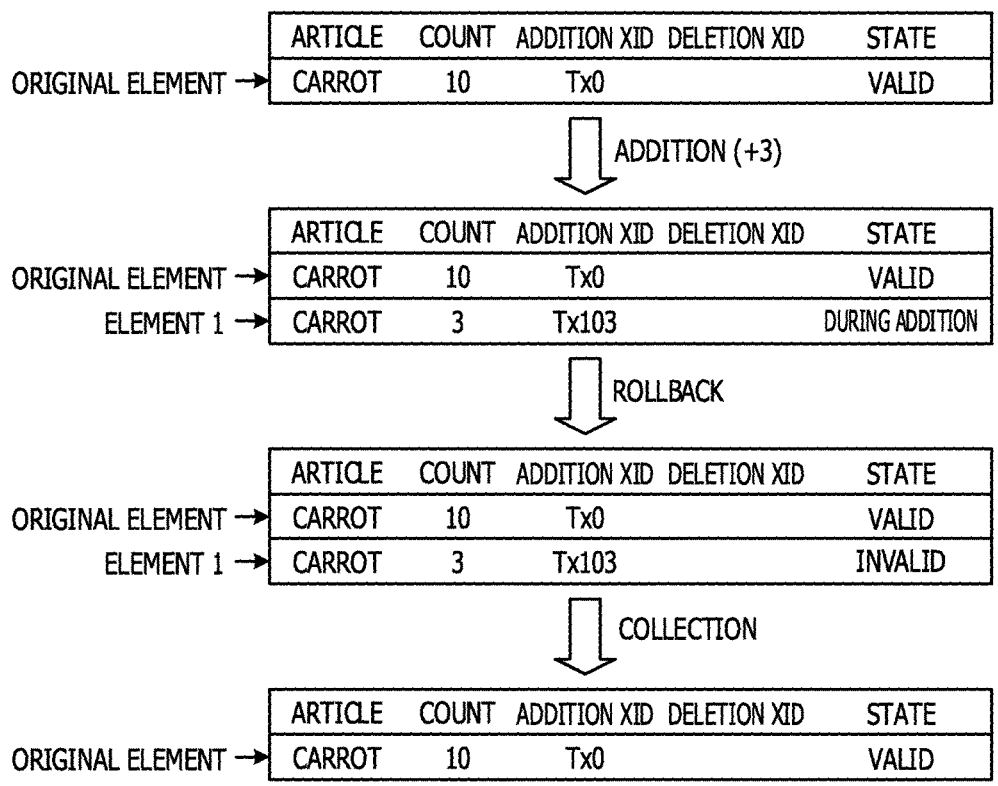

In the embodiment, when the transaction of addition is rolled back, the element generated by the addition is deleted (Step S444 in FIG. 18), but the state of the element may be set to "invalid" once. For example, as illustrated in FIG. 26, the state of the element 1 generated by addition is changed to "invalid" at rollback. In this case, the element 1 becomes invisible from any transaction. An increase in the number of elements can be suppressed by collecting (deleting) the element 1.

Although the database management program 50 or 250 as an example of the update processing program in accordance with the disclosed technique is previously stored (installed) in the storage unit 46 in the above embodiments, the update processing program is not limited to this. The update processing program in accordance with the disclosed technique may be recorded in a record medium such as a CD-ROM, a DVD-ROM, and an USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A method executed by a computer, the method comprising:
  storing a first record including a first numerical data in a database;
  receiving a subtraction request to subtract a second numerical data from the first numerical data of the first record;
  generating, in response to a reception of the subtraction request, a second record including the second numerical data indicated by the subtraction request and modifying the first numerical data of the first record to a third numerical data obtained by subtracting the second numerical data from the first numerical data, wherein the first record is set in an unlocked state to enable a process for another request and the second record is set in a locked state in which any requests other than the subtraction request is blocked; and deleting the second record in accordance with confirmation of the processing the subtraction request.

2. The method according to claim 1, further comprising:

when the update content is subtracting, in a case where a plurality of records are generated by the generating, selecting one or more records selected from the generated records such that a sum of values of the numerical data item is equal to or larger than the second value; and setting the selected one or more records as records to be updated.

3. The method according to claim 1, further comprising:

upon receipt a request of reference processing for the numerical data item in the first record, in a case where a plurality of records are generated by the generating, setting a sum of values of the numerical data item in the plurality of records to the numerical data item to be referred to.

4. The method according to claim 1, further comprising:

calculating a sum of values of the numerical data item in a second plurality of records having the same state of the update processing among a first plurality of records generated by the generating in response to a request of a plurality of the update processings of a certain transaction; and merging the second plurality of records by generating a record in which the calculated sum is set to the numerical data item.

5. The method according to claim 1, wherein the generating is executed when a certain criterion about updating of the numerical data item by the update processing is satisfied, and the generating is kept from being executed when the certain criterion is not satisfied.

6. The method according to claim 5, wherein the certain criterion is that the value of the numerical data item does not fall below a predetermined value as a result of the update processing.

7. An apparatus comprising:

a memory configured to store a first record including a first numerical data in a database; and a processor coupled to the memory and configured to execute a process including:

receiving a subtraction request to subtract a second numerical data from the first numerical data of the first record;

generating, in response to a reception of the subtraction request, a second record including the second numerical data indicated by the subtraction request and modifying the first numerical data of the first record to a third numerical data obtained by subtracting the second numerical data from the first numerical data, wherein the first record is set in an unlocked state to enable a process for another request and the second record is set in a locked state in which any requests other than the subtraction request is blocked; and deleting the second record in accordance with confirmation of the processing the subtraction request.

8. The apparatus according to claim 7, wherein the process further including:

selecting one or more records selected from the generated records such that a sum of values of the numerical data item is equal to or larger than the second value, and setting the selected one or more records as records to be updated.

9. The apparatus according to claim 7, wherein the process further including:

upon receipt a request of reference processing for the numerical data item in the first record, in a case where a plurality of records are generated by the generating, setting a sum of values of the numerical data item in the plurality of records to the numerical data item to be referred to.

10. The apparatus according to claim 7, wherein the process further including:

calculating a sum of values of the numerical data item in a second plurality of records having the same state of the update processing among a first plurality of records generated by the generating in response to a request of a plurality of the update processings of a certain transaction, and merging the second plurality of records by generating a record in which the calculated sum is set to the numerical data item.

11. The apparatus according to claim 7, wherein the generating is executed when a certain criterion about updating of the numerical data item by the update processing is satisfied, and the generating is kept from being executed when the certain criterion is not satisfied.

12. The apparatus according to claim 11, wherein the certain criterion is that the value of the numerical data item does not fall below a predetermined value as a result of the update processing.

* * * * *